US010410113B2

(12) United States Patent
Clayton et al.

(10) Patent No.: US 10,410,113 B2
(45) Date of Patent: Sep. 10, 2019

(54) TIME SERIES DATA ADAPTATION AND SENSOR FUSION SYSTEMS, METHODS, AND APPARATUS

(71) Applicant: Preferred Networks, Inc., Tokyo (JP)

(72) Inventors: Justin B. Clayton, Menlo Park, CA (US); Daisuke Okanohara, Tokyo (JP); Shohei Hido, Burlingame, CA (US)

(73) Assignee: PREFERRED NETWORKS, INC., Tokyo (JP)

( * ) Notice: Subject to any disclaimer, the term of this patent is extended or adjusted under 35 U.S.C. 154(b) by 788 days.

(21) Appl. No.: 14/995,688

(22) Filed: Jan. 14, 2016

(65) Prior Publication Data
US 2017/0206464 A1 Jul. 20, 2017

(51) Int. Cl.
*G06N 3/04* (2006.01)
(52) U.S. Cl.
CPC ......... *G06N 3/0454* (2013.01); *G06N 3/0445* (2013.01)
(58) Field of Classification Search
USPC .......................................................... 706/12
See application file for complete search history.

(56) References Cited

U.S. PATENT DOCUMENTS

| 5,956,702 A | 9/1999 | Matsuoka et al. | |
| 9,122,771 B2* | 9/2015 | Hido | G06K 9/6892 |
| 9,218,572 B2* | 12/2015 | Hido | G06N 20/00 |
| 9,471,882 B2* | 10/2016 | Hido | G06N 20/00 |
| 9,857,775 B2* | 1/2018 | Hamzaoui | G05B 23/0281 |
| 9,990,587 B2* | 6/2018 | Okanohara | G06N 20/00 |
| 2012/0296605 A1* | 11/2012 | Hamzaoui | H04Q 9/00 702/184 |
| 2012/0296606 A1* | 11/2012 | Hamzaoui | H04Q 9/00 702/184 |

(Continued)

OTHER PUBLICATIONS

ACM (DL) Gigital Library Training energy-based models for time-series imputation Journal of Machine Learning Research 14 (2013) pp. 2771-2797 Phile'mon Brakel, Dirk Stroobandt, Benjamin Schrauwen.*

(Continued)

*Primary Examiner* — Michael B Holmes
(74) *Attorney, Agent, or Firm* — Foley & Lardner LLP

(57) ABSTRACT

Systems, methods, and apparatus for time series data adaptation, including sensor fusion, are disclosed. For example, a system includes a variational inference machine, a sequential data forecast machine including a hidden state, and a machine learning model. The sequential data forecast machine exports a version of the hidden state. The variational inference machine receives as inputs time series data and the version of the hidden state, and outputs a time dependency infused latent distribution. The sequential data forecast machine obtains the version of the hidden state, receives as inputs the time series data and the time dependency infused latent distribution, and updates the hidden state based on the time series data, the time dependency infused latent distribution, and the version of the hidden state to generate a second version of the hidden state. The time dependency infused latent distribution is input into the machine learning model, which outputs a result.

40 Claims, 22 Drawing Sheets

(56) References Cited

U.S. PATENT DOCUMENTS

| | | | |
|---|---|---|---|
| 2013/0116991 A1* | 5/2013 | Hido | G06F 17/10 703/2 |
| 2013/0116992 A1* | 5/2013 | Hido | G06F 17/10 703/2 |
| 2016/0371316 A1* | 12/2016 | Okanohara | G06N 3/0454 |
| 2017/0031329 A1* | 2/2017 | Inagaki | B25J 9/163 |
| 2017/0161603 A1* | 6/2017 | Okanohara | G06N 3/04 |
| 2017/0206464 A1* | 7/2017 | Clayton | G06N 99/005 |

OTHER PUBLICATIONS

Chung et al., "Emperical Evaluation of Gated Recurrent Neural Networks on Sequence Modeling", University of Montreal, Dec. 11, 2014 (9 pages).

Chung et al., "A Recurrent Latent Variable Model for Sequential Data", Department of Computer Science and Operations Research, University of Montreal, Jun. 19, 2015 (9 pages).

Graves et al., "Multi-Dimensional Recurrent Neural Networks", May 14, 2007 (10 pages).

Graves, "Generating Sequences With Recurrent Neural Networks", Department of Computer Science, University of Toronto, Jun. 5, 2014 (43 pages).

Hochreiter et al., "Long Short-Term Memory", Neural Computation, 1997, vol. 9, No. 3 (32 pages).

Kingma et al., "Auto-Encoding Variational Bayes", University of Amsterdam, May 1, 2014 (21 pages).

Kingma et al., "Semi-supervised Learning with Deep Generative Models", University of Amsterdam, Oct. 31, 2014 (9 pages).

Mikolov et al., "Learning Longer Memory in Recurrent Neural Networks", Facebook Artificial Intelligence Research, Dec. 2014 (9 pages).

Sutskever et al., "Sequence to Sequence Learning with Neural Networks", retrieved from http://papers.nips.cc/paper/5346-sequence-to-sequence-learning-with-neural-networks.pdf (9 pages).

Bayer et al., Variational inference of latent state sequences using Recurrent Networks, arXiv (Jun. 6, 2014), Retrieved from the Internet <URL: https://arxix.org/pdf/1406.1655v1.pdf> pp. 1-12.

International Search Report and Written Opinion of PCT/JP2017/001033 dated Mar. 28, 2017.

* cited by examiner

TIME SERIES DATA ADAPTATION AND SENSOR FUSION SYSTEMS, METHODS, AND APPARATUS

BACKGROUND

A time series is a sequence of data points, typically consisting of successive measurements made over a time interval. Time series data is used in a wide variety of applications, and is often analyzed to extract meaningful information about a time series and/or to forecast future events or time series values. For example, time series data may be analyzed using machine learning techniques. A variety of types of machine learning methods exist (e.g., linear regression model, naïve Bayes classifier). Machine learning is commonly used for addressing "Big Data" problems in which the volume, variety, and velocity of data are high and/or real time data processing may be desired. There are many different domains or modalities from which time series data can be collected, many types of time series data, and many different sources from which time series data may be collected or generated. Typically, for a particular method of time series analysis or machine learning, one or more specific types of time series data is input to produce the desired results, such as a detection or prediction of some characteristic or event.

SUMMARY

The present disclosure provides new and innovative systems, methods, and apparatus for time series data adaptation and sensor fusion. In an example embodiment, a system includes a variational inference machine, a sequential data forecast machine including a hidden state, and a machine learning model. The sequential data forecast machine exports a first version of the hidden state. The variational inference machine receives as inputs time series data and the first version of the hidden state, and outputs a time dependency infused latent distribution. The sequential data forecast machine obtains the first version of the hidden state, receives as inputs the time series data and the time dependency infused latent distribution, and updates the hidden state based on the time series data, the time dependency infused latent distribution, and the first version of the hidden state to generate a second version of the hidden state. The time dependency infused latent distribution is input into the machine learning model, which outputs a result based on the time dependency infused latent distribution.

In an example embodiment, a system includes a multi-modal variational inference machine and a multi-modal sequential data forecast machine including a hidden state. The multi-modal sequential data forecast machine exports a first version of the hidden state. The multi-modal variational inference machine receives as inputs first and second time dependency infused latent distributions and the first version of the hidden state, and outputs a multi-modal time dependency infused latent distribution. The multi-modal sequential data forecast machine obtains the first version of the hidden state, receives as inputs the first and second time dependency infused latent distributions and the multi-modal time dependency infused latent distribution, and updates the hidden state based on the first and second time dependency infused latent distributions, the multi-modal time dependency infused latent distribution, and the first version of the hidden state to generate a second version of the hidden state.

Additional features and advantages of the disclosed method and apparatus are described in, and will be apparent from, the following Detailed Description and the Figures.

DETAILED DESCRIPTION OF EXAMPLE EMBODIMENTS

Figure 1:
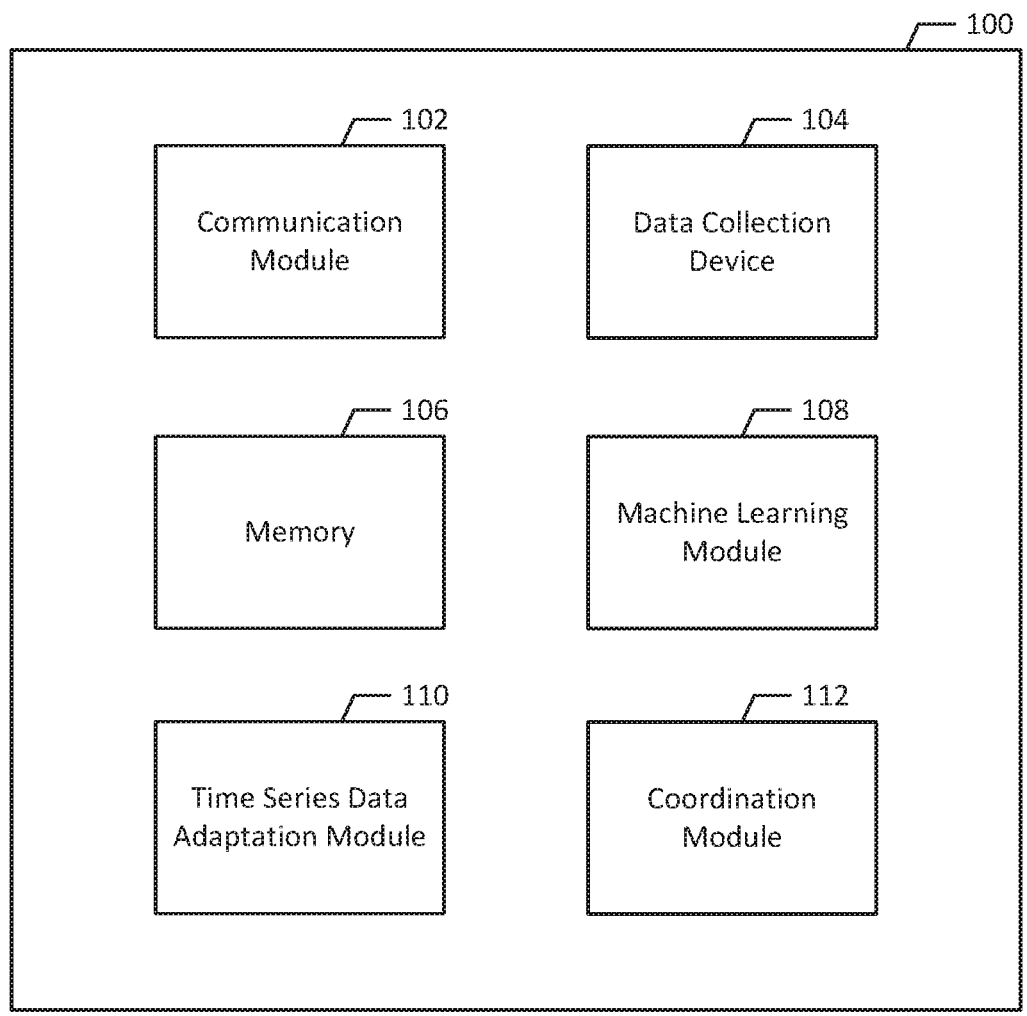
FIG. 1 is a block diagram of an example of an edge device, according to an example embodiment of the present disclosure.

FIG. 1 is a block diagram of an example of an edge device 100, according to an example embodiment of the present disclosure. In an example embodiment, the edge device 100 may be an advanced driver assistance system or an autonomous vehicle. In another example embodiment, the edge device 100 may be a home health monitoring device. In other example embodiments, the edge device 100 may be a thermal video camera or an ultrasound detector. The example edge device 100 is a device that is capable of performing data collection, performing machine learning, and performing time series data adaptation, which may include sensor fusion. Typically, an edge device 100 is also capable of performing communication with other devices. In an example embodiment, an edge device 100 is on the edge, or outermost layer, of a large distributed network of data connected devices, including central servers, intermediate servers, data repositories, gateways, routers, and the like. Edge devices 100 may include a wide variety of devices including recording devices (e.g., digital cameras, video cameras, audio recorders), city management devices (e.g., parking sensors, traffic sensors, water quality devices), vehicles (e.g., cars, trucks, airplanes), body sensors (e.g., activity sensors, vital signs sensor, pedometers), environmental sensors (e.g., weather sensors, pollution sensors, air quality sensors), wearable computing devices (e.g., smart watch, glasses, clothes), personal computing devices (e.g., mobile phone, tablet, laptop), home devices (e.g., appliances, thermostats, light systems, security system), advertising devices (e.g., billboards, information kiosks), etc. The edge device 100 may include a communication module 102, a data collection device 104, a memory 106, a machine learning module 108, a time series data adaptation module 110, and a coordination module 112.

The communication module 102 is configured to communicate with other devices including other edge devices 100 of the same type (e.g., multiple thermal video cameras) or of a different type (e.g., a thermal video camera and an ultrasound detector), and/or server devices or the like. For example, as described in further detail below, the communication module 102 may be configured to communicate with other devices via one or more networks or communications channels, including the Internet, or any suitable wide area network, local area network, gateway, or other communication channel or network. For example, the communication module 102 may be configured for wireless communications via multiple protocols employed by cellular networks (e.g., 4G, 3G, GSM), wireless local area network (e.g., Wi-Fi), satellite (e.g., VSAT), or any suitable form of wireless communication (e.g., Bluetooth, RFID, NFC, IrDA, Li-Fi). Also, for example, the communication module 102 may be configured for a wired connection to another edge device 100 (e.g., Ethernet, DSL, USB, RS-232, coaxial cable). Further, the communication module 102 may communicate with a user, for example, via a graphical user interface which may be implemented with a touch screen display. The user may be able to request the edge device 100 to perform a specific task and/or receive information from the edge device 100. Thus, the communication module 102 may include hardware and/or software configured to communicate via one or more communication interfaces using one or more communication protocols. In an example embodiment, the communication module 102 may send messages or instructions to various actuators or hardware components within the edge device 100 or in other devices that may take action (e.g., emergency corrective action) based on the instructions. For example, an intermediate server, which communicates with one or more edge devices 100 and with one or more different servers (e.g., a central server), may receive a message or instructions from the edge device 100.

A data collection device 104 may be a sensor, detector, or any device suitable for real time collection of data representative of real world characteristics (e.g., distances, ultrasound levels, speed, acceleration, items in a shopping cart, hand movements, shapes, temperature, angles, voice recognition, word recognition, torque, slip levels). The data collection device 104 may receive a continuous data stream or collect data on a periodic basis (e.g., every millisecond, second, minute), which may generally depend on the type of data being collected and the variability of the data stream. A time series of data type X may be referred to herein as x, where $x = <x_1, x_2, x_3, \ldots x_t>$. A data collection device 104 typically includes specific hardware and/or physical structures specifically configured to collect a certain type of data (e.g., an image sensor, a radar sensor, a lidar sensor, an ultrasonic sensor, an accelerometer, a gyroscope sensor, a thermometer, a blood oxygen sensor, a pulse oximetry sensor, a pH sensor, a spirometer, a respiration sensor, a smoke sensor, an altimeter, a Hall effect sensor, a velocimeter, a photodetector, a bolometer, a flow sensor, a strain gauge, a torque sensor, a tachometer, a clinometer, a microphone, a magnetometer, a voltmeter, an ammeter, an ohmmeter, a chemical sensor, a pressure sensor, a rain sensor, a hygrometer, a humistor, an anemometer, a seismometer, a Geiger counter, etc.). In an example embodiment, one edge device 100 may include multiple different data collection devices 104 that collect different types of data. The data collection device 104 provides the collected data to the memory 106. In an example embodiment, the memory 106 may be specialized memory for receiving and storing large amounts of data, such as video image data (e.g., VRAM). Thus, the memory 106 may have specialized hardware that is task specific, for example, to meet high throughput and low latency specifications of the edge device 100. The memory 106 may include different tiers of memory, such as buffers, shift registers, and the like. The memory 106 may be configured to store the collected data temporarily, and may be overwritten once the collected data is no longer needed by the machine learning module 108 and/or the time series data adaptation module 110.

A machine learning module 108 may execute a machine learning model using time series data collected by one or more data collection devices 104 and stored in memory 106. The machine learning module 108 may receive collected time series data as inputs and/or may receive adapted data that is representative of collected time series data (e.g., sensor fusion data) as inputs, which may also be stored in memory 106. The machine learning module 108 executes the machine learning model using the collected and/or adapted data to make a forecast, a prediction, a classification, a clustering, an anomaly detection, and/or a recognition, which is then output as a result. The machine learning model may iteratively update the result. For example, the machine learning model may continuously execute using all available collected data stored in memory or using adapted data representative of collected time series data, and may produce a continuous result or a periodic result. If the volume and velocity of data collected is relatively low (sparse and/or slow), for example, the machine learning model may only periodically execute, and may be dormant for a period of time after each result is output, while new data is collected. Each machine learning model relates to a predefined task (e.g., detecting a potential collision, classifying chronic obstructive pulmonary disease (COPD) risks, detecting a faulty steam trap, prediction of an item, recognition of sweethearting theft, recognition of a suspect for a be-on-the-lookout (BOLO) alert, classification of cornering speeds). For example, for a machine learning model for a vehicle edge device 100, the predefined task may be detecting when collision avoidance measures need to be implemented. The vehicle edge device 100 may be mounted on or in a vehicle (e.g., an autonomous vehicle or an unmanned vehicle), and may concurrently detect a plurality of different time series (e.g., lidar, video, radar, ultrasound, and speed or velocity). The machine learning module 108, using one or more of the detected plurality of different time series, may be executed and output a detection that a collision will imminently occur under certain conditions. The detection may trigger collision avoidance actuations, such as steering and/or braking the vehicle. The use of lidar data, video data, radar data, and ultrasound data to provide information about the surroundings of the vehicle may provide optimal detection of imminent collisions; however, suitable lidar data collection devices 104 may be relatively expensive (e.g., $8,000 per unit). Thus, in many cases, a trade off between cost and quality of collected data exists, and accordingly, lidar may not be available for use as a data collection device 104 on some vehicles.

Machine learning models may separately use one of the different time series as its input, and/or a machine learning model may use more than one of the different time series as its input, which is a multi-modal input of time series data. A machine learning model is trained for a predefined type of input, using one or more particular types of data, which may include time series data from one or more sensors and/or adapted data that is representative of time series data from one or more sensors. The predefined type of input for the machine learning model may be a time series from a sensor, multiple time series from different sensors, a distributed representation of a time series from a sensor, or a distributed representation of multiple time series from different sensors. A distributed representation is a version of time series data that typically has reduced dimensionality but generally preserves the most important information, and in some cases may be nearly lossless. A machine learning model requires the correct type of data to be received as its input. For example, even though ultrasound sensor data and lidar sensor data may both be providing information on the same phenomenon (or be correlated with an underlying phenomenon), a machine learning model trained to receive a time series of ultrasound data cannot properly use a time series of lidar sensor data, and vice versa. However, a machine learning model may be trained to use as its input a combined data type created from different types of data that are each from different domains or modalities, such as ultrasound and lidar. A combined data type may result from performing sensor fusion, as discussed in further detail below. A machine learning model that receives a sensor fusion combined data type as its input may benefit from synergies between the different modalities of data, enabling the machine learning model to provide better results than machine learning models receiving uncombined sensor data types. However, a machine learning model that is trained to receive the sensor fusion combined data type as its input requires the correct type of input. Accordingly, the machine learning module 108 may include a variety of different machine learning models to account for situations when one or more sensors that provide data to create the required sensor fusion combined data type is missing.

In an example embodiment, three sensors A, B, and C, are used to create a fused time series ABC, which is used in a machine learning model trained to receive time series ABC as its input, and which provides more accurate results (e.g., detection of an imminent collision) in comparison to any of individual time series A, B, or C alone in machine learning models trained to receive the respective individual time series. However, if any of sensors A, B, or C is temporarily unavailable, then the machine learning model trained to receive time series ABC as its input cannot be used (or will provide suboptimal and unsuitable results). Thus, for example, a machine learning model trained to use time series AB, or time series AC, or time series BC may need to be available to switch to immediately when a sensor A, B, and/or C becomes intermittently unavailable. In this example, there may be 7 different models (ABC, AB, AC, BC, A, B, and C) that must be trained to account for the possibility of one or more sensors being unavailable because the machine learning models are not fault tolerant. Switching between machine learning models on the fly as described above may be suitable in some circumstances; however, when the number of different types of sensors becomes large, intermittently missing data may become significantly more problematic. Specifically, the number of machine learning models that need to be trained may increase drastically with even a relatively small increase in the number of different types of sensors. For example, adding one more sensor D to sensors A, B, and C increases the number of machine learning models that would need to be trained in this system by 8, and a system with 10 sensors may require 1,023 machine learning models. As the number of sensors grows, the number of required machine learning models grows in an exponential manner. If dozens or hundreds of sensors are used to create a fused time series, to address the problem of intermittently unavailable data, a combinatorial explosion occurs, rendering it difficult or impossible to have the necessary trained machine learning models to switch between when sensor data is intermittently unavailable, particularly for performing in real-time analysis (e.g., collision avoidance). For example, a system with 300 sensors, there are $9.37 \times 10^{88}$ combinations of 150 of the 300 sensors. Moreover, a system that requires a new machine learning model for every combination of sensors lacks adaptability in practice for real-time data analysis.

A time series data adaptation module 110 is configured to adapt time series data into one or more distributed representations, which may be provided to the machine learning module 108. The time series data adaptation module 110 may perform first-order adaptations, second-order adaptations, and/or higher-order adaptations or mixed adaptations. First-order adaptations include adaptations of time series data into a distributed representation. Second-order adaptations include adaptions of distributed representations into a fused distributed representation. Higher-order adaptations (e.g., third-order) include adaptions of fused distributed representations, such as global data representations. Mixed adaptations include adapting different levels of data, such as fusing a time series and a distributed representation. The time series data adaptation module 110 may advantageously provide distributed representations to the machine learning module that are dense, information-rich, and robust to improve fault tolerance within the system, decrease the required costs of sensors, decrease the impact from sensor failure or unavailability, decrease the amount of data to be transmitted and stored, increase the speed of processing time and data transfer, and improve the accuracy, precision, and consistency of results. The time series data adaptation module 110 as described herein may be particularly advantageous for improving results during real-time data analysis when sensor data is unavailable, both intermittently and/or permanently. In an example embodiment, the time series data adaptation module 110 performs sensor fusion, as described in further detail below.

A coordination module 112 may coordinate the processes of the communication module 102, the data collection device 104, the memory 106, the machine learning module 108, and the time series data adaptation module 110. An edge device 100 may have a central processing unit, and may also have one or more additional processors dedicated to various specific tasks. Each edge device 100 may use one or more processors, memories, buses, and the like. Also, each one of the communication module 102, the data collection device 104, the memory 106, the machine learning module 108, the time series data adaptation module 110, and the coordination module 112 may use one or more processors, memories, buses, and the like. A processor, memory, and any other component may be shared by one or more of the communication module 102, the data collection device 104, the memory 106, the machine learning module 108, the time series data adaptation module 110, and the coordination module 112. In an example embodiment, each one of the communication module 102, the data collection device 104, the memory 106, the machine learning module 108, the time series data adaptation module 110, and the coordination module 112 uses some dedicated hardware and software that is distinct from each other module or component.

Figure 2:
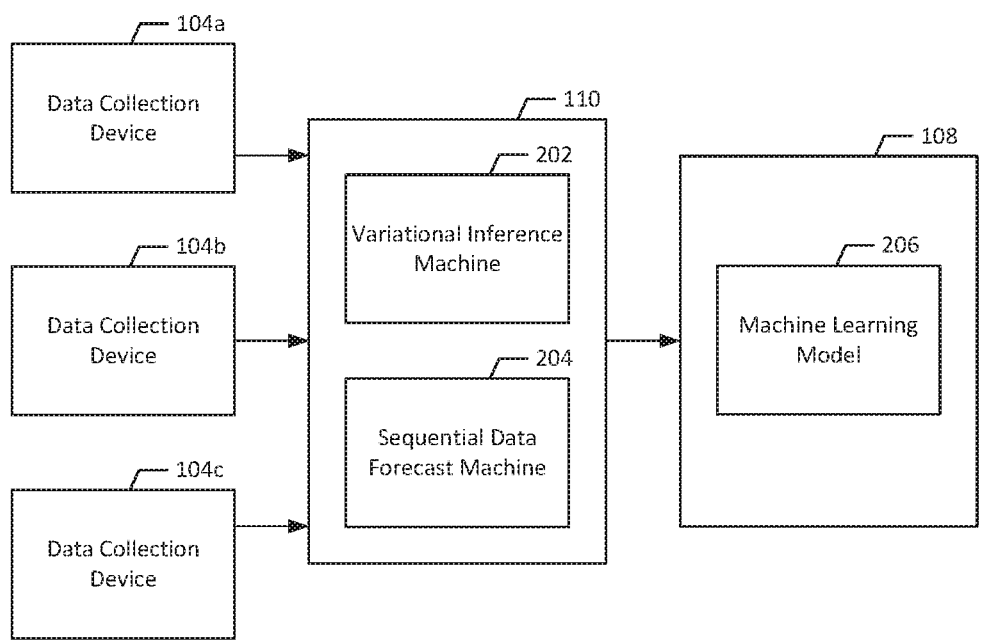
FIG. 2 is a high-level flow diagram illustrating time series data adaptation, according to an example embodiment of the present disclosure.

FIG. 2 is a high-level flow diagram illustrating time series data adaptation, according to an example embodiment of the present disclosure. A plurality of data collection devices 104a, 104b, 104c provide time series data to the time series data adaptation module 110. For example, data collection device 104a may be a lidar sensor, data collection device 104b may be a radar sensor, and data collection device 104c may be an ultrasound sensor. The time series data adaptation module 110 includes a variational inference machine 202 and a sequential data forecast machine 204. Although only one pair of the variational inference machine 202 and the sequential data forecast machine 204 are illustrated in FIG. 2, the time series data adaptation module 110 may include multiple variational inference machines 202 and sequential data forecast machines 204 of different types and configurations, and as discussed in greater detail below, the variational inference machines 202 and sequential data forecast machines 204 may process various different types of input data. For example, the time series data adaptation module 110 may receive as inputs single-modal time series data, multi-modal time series data, single-modal distributed representations, and/or multi-modal distributed representations. As discussed further below, a variational inference machine 202 may be a single-modal variational inference machine or a multi-modal variational inference machine; likewise, a sequential data forecast machine 204 may be a single-modal sequential data forecast machine or a multi-modal sequential data forecast machine. Creating multi-modal data using single-modal data from sensors of different domains or modalities (e.g., lidar, image, radar, temperature, ultrasound) may be referred to as sensor fusion. Through sensor fusion, time series data from different modalities of sensors may be fused to form more robust, information-rich data types that are better suited for producing reliable, accurate, precise and/or quick recognition results in machine learning analysis or the like. When two different types of data both provide information about the same phenomenon or are correlated with an underlying phenomenon, these types of data may provide significant synergy for machine learning and may be particularly suitable for sensor fusion. Thus, the time series data adaptation module 110 adapts the time series data from the data collection devices 104a, 104b, 104c into one or more distributed representations, which may be used as input to the machine learning model 206. In an example embodiment, the time series data adaptation module 110 outputs a distributed representation for each of the data collection devices 104a, 104b, 104c. In another example embodiment, the time series data adaptation module 110 outputs a fused distributed representation.

It should be appreciated that the time series data adaptation module 110 illustrated in FIG. 2 is merely a non-limiting example, as a time series data adaptation module 110 may include multiple variational inference machines 202 and sequential data forecast machines 204, which may be single-modal and/or multi-modal, as required for each particular system. Likewise, a machine learning module 108 may include many different machine learning models 206. In some cases, an edge device 100 will only have one purpose, collecting one or more specific types of time series data, adapting the collected time series data as a distributed representation, and executing the machine learning module 108 using the distributed representation. For example, such edge devices 100 may be hard coded to perform specific data collection, data adaptation, and machine learning tasks (e.g., using an ASIC). However, some edge devices 100 may be multi-purpose machines that may be requested to handle a variety of different tasks at different times or simultaneously, be configurable to handle new tasks as needed, or the like. These edge devices 100 may typically have many different variational inference machines 202, sequential data forecast machines 204, and machine learning models 206, and may include configurable software modules which can add and/or update the variational inference machines 202, sequential data forecast machines 204, and machine learning models 206.

Figure 3:
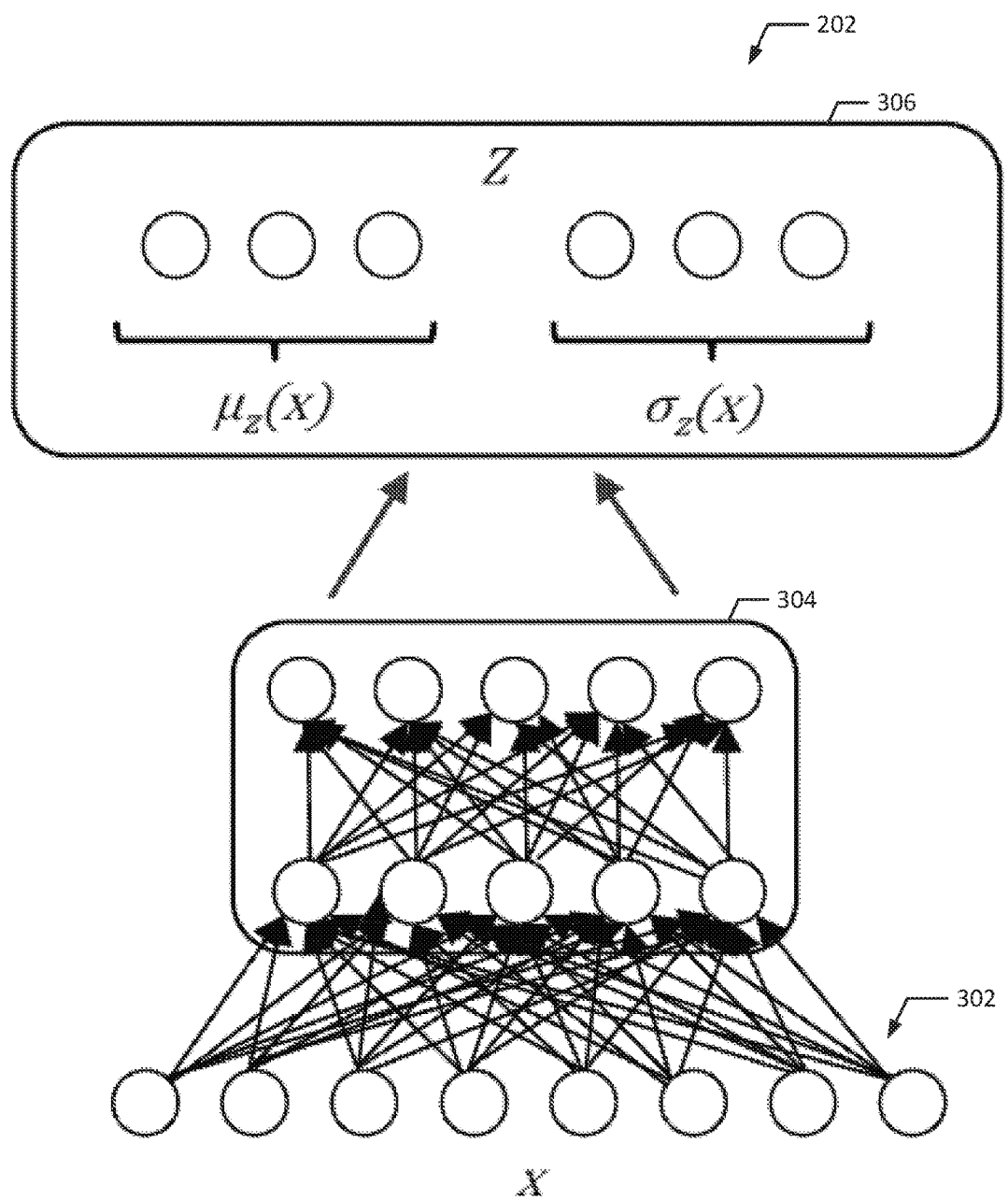
FIG. 3 is high-level block diagram of a variational inference machine, according to an example embodiment of the present disclosure.

FIG. 3 is high-level block diagram of a variational inference machine 202, according to an example embodiment of the present disclosure. The variational inference machine 202 includes an input layer 302, a plurality of hidden layers 304, and an output layer 306. In an example embodiment, the input layer 302 has 8 nodes and receives the input variable x, which is an 8-tuple, where each element of the 8-tuple represents an attribute. Each node receives a value of one element of the 8-tuple at each time interval. For example, the input variable x may be the time series data values output from a data collection device 104 (e.g., an ultrasound sensor). The data received in the input layer 302 is provided to the hidden layers 304 of the variational inference machine 202. The hidden layers 304 may be provided in the form of a neural network or the like. The hidden layers 304 may be structured to encode the data input into the input layer 302 as a latent distribution z, which is output from the output layer 306. A latent distribution includes one or more distributions, which provide a probabilistic distributed representation of the input variable of the variational inference machine. A probabilistic distributed representation is a set of latent variables defined by probability distributions as opposed to latent variables defined by discrete values. As illustrated in FIG. 3, the output layer has 6 nodes, and the latent distribution z includes a set of three distributions, where each distribution may be defined by a mean $\mu_z(x)$ and a standard deviation $\sigma_z(x)$ (e.g., for Gaussian distributions). It should be appreciated that the specific node structure illustrated in FIG. 3 is merely a non-limiting example, and for example, a variational inference machine may include an input layer with any suitable quantity of nodes, any suitable quantity of the hidden layers, and each hidden layer may have any suitable number of nodes and any suitable structure of connections between nodes, and any suitable quantity of nodes in the output layer.

Figure 4:
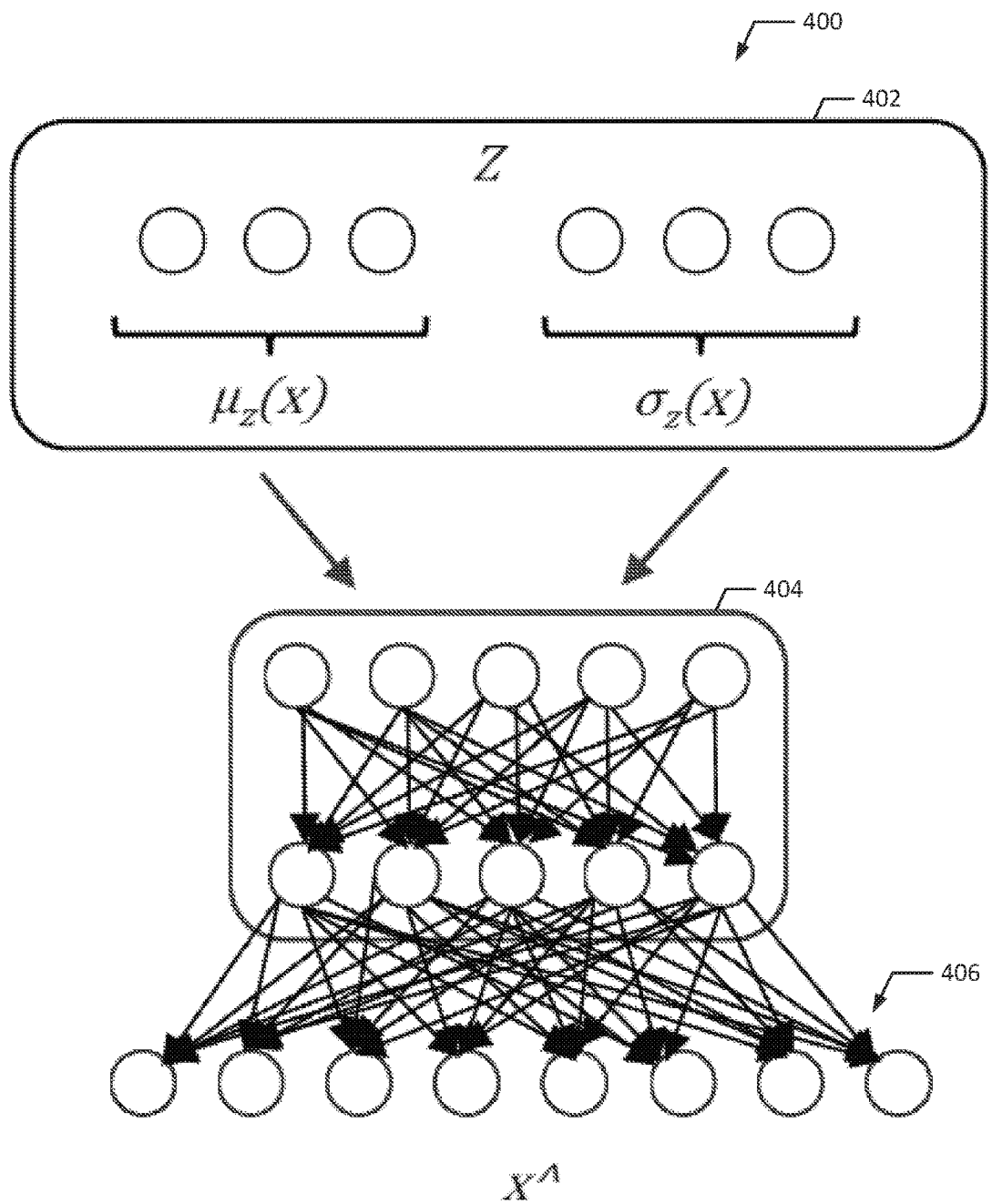
FIG. 4 is a high-level block diagram of a variational generation machine, according to an example embodiment of the present disclosure.

FIG. 4 is a high-level block diagram of a variational generation machine 400, according to an example embodiment of the present disclosure. The variational generation machine 400 includes an input layer 402, a plurality of hidden layers 404, and an output layer 406. In an example embodiment, the input layer 402 receives the latent distribution z that is output from the variational inference machine 202 to regenerate the data input into the variational inference machine (e.g., input variable x). For example, the input layer 402 has 6 nodes and receives as input the latent distribution z, which includes 3 distributions at each time interval, where each distribution may be defined by a mean $\mu_z(x)$ and a standard deviation $\sigma_z(x)$. For example, the latent distribution z, over a series of time intervals, may be a series of distributed representations of the data values output from a data collection device 104 (e.g., an ultrasound sensor). The data received in the input layer 402 is provided to the hidden layers 404 of the variational generation machine 400. The hidden layers 404 may be provided in the form of a neural network or the like. The hidden layers 404 may be structured to decode the latent distribution z input into the input layer 402, which was output from the output layer 306 of the variational inference machine. Decoding the latent distribution z with the hidden layers 404 reconstructs or recovers the input variable x as a generated variable x̂, which approximates x. The output layer 406 may include 8 nodes and provide the generated variable x̂, which may be used to train the variational inference machine 202, as discussed below. It should be appreciated that the specific node structure illustrated in FIG. 4 is merely a non-limiting example, and for example, a variational generation machine may include an input layer with any suitable quantity of nodes, any suitable quantity of hidden layers, and each hidden layer may have any suitable number of nodes and any suitable structure of connections between nodes, and any suitable quantity of nodes in the output layer.

Figure 5:
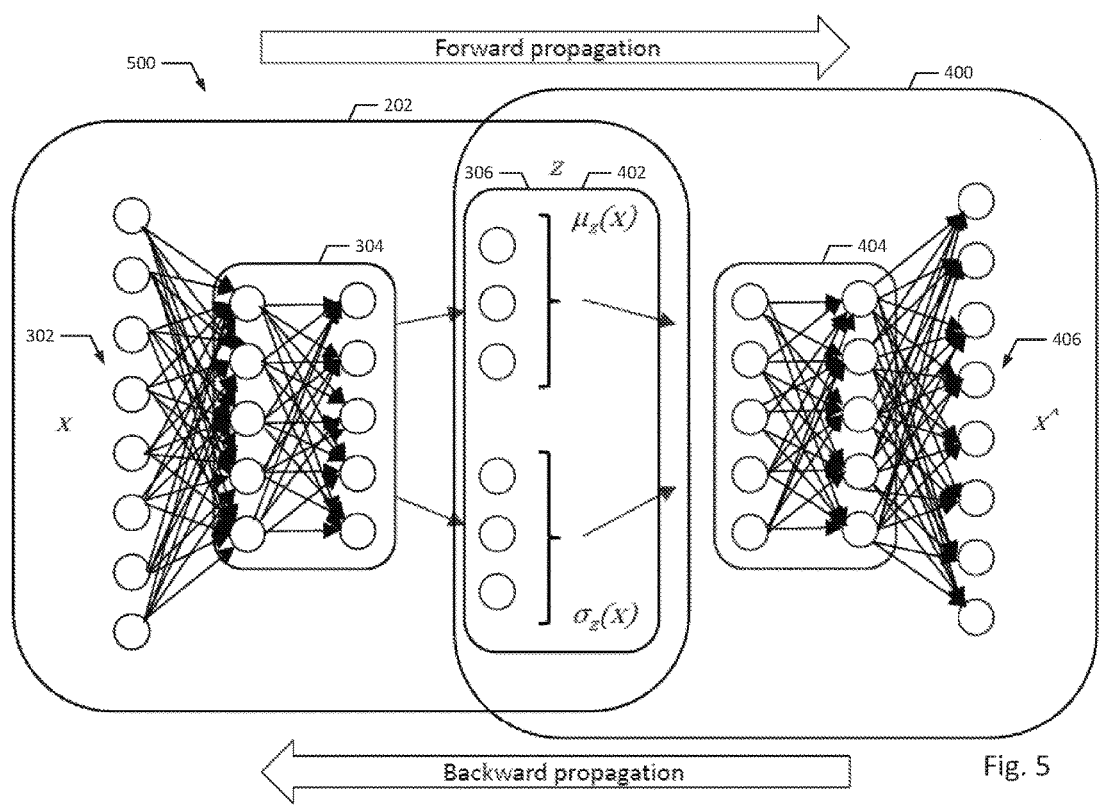
FIG. 5 is a high-level block diagram illustrating an example process for training a variational inference machine, according to an example embodiment of the present disclosure.

FIG. 5 is a high-level block diagram illustrating an example process 500 for training a variational inference machine 202, according to an example embodiment of the present disclosure. In an example embodiment, a variational autoencoder is used to train a variational inference machine 202 and a variational generation machine 400. For example, both of the variational inference machine 202 and the variational generation machine 400 may be simultaneously trained as an autoencoder using backpropagation with stochastic gradient ascent to maximize a variational lower bound. For example, backpropagation training may iteratively include forward propagation, backward propagation, and updating weights in the hidden layers, for example using log likelihood techniques as described in more detail below. A variational inference machine 202 for a data type X may be trained using a set of time series $\{x_1, x_2, \ldots x_n\}$, all of data type X, so that once trained, the variational inference machine 202 will optimally encode an input variable x. It should be appreciated that sufficient training data is required. For example, the training data may require ample sets of time series, adequate length of the time series (e.g., data for enough time intervals), and rich enough time series (e.g., not overly sparse data sets). The quality and the amount of training data may dictate the accuracy, consistency, robustness, and adaptability of the variational inference machine.

A variational autoencoder includes a variational inference machine 202 that includes an input layer, at least one hidden layer, which includes a plurality of nodes, and an output layer, and a variational generation machine 400 that includes an input layer, at least one hidden layer, which includes a plurality of nodes, and an output layer. Typically, connections to and from a hidden layer (e.g., between hidden layers) include nonlinear connections. Since the mappings between the input variable x and the latent distribution z are nonlinear, the inference of the true posterior distribution is intractable. Thus, the variational inference machine 202 may be described as using a variational approximation that may be trained to approximate the true posterior, where an inference probability may be parameterized and implemented as a neural network in the hidden layers 304. Training the variational inference machine 202 includes derivation of a variational lower bound of the variational approximation, for example, using a log likelihood technique. For example, a log likelihood technique using Kullback-Leibler divergence (KL divergence), which measures the difference between two different probability distributions (e.g., prior Q and posterior P), has a variational lower bound that is equal to a KL divergence term which acts as a regularization term that imposes a penalty on complexity of the variational approximation to avoid overfitting the training data, and a negative reconstruction error, which is a measure of error between x and x̂. During training, the goal is to maximize the variational lower bound, which will give the largest log likelihood. To maximize the variational lower bound, the KL divergence term is minimized and the negative reconstruction error is maximized through backpropagation. When the generated variable x̂ has only minimal differences to the input variable x, then the latent distribution z will generally be an information rich and dense probabilistic distributed representation of the input variable x, which may advantageously be robust to permanently and/or intermittently unavailable data (e.g., during sensor failure). Thus, the latent distribution z may be an optimal input for a machine learning model 206.

In an example embodiment, the training may include using stochastic masks. For example, a stochastic mask can be used to randomly zero-out values of the input data during training so that the trained variational inference machine 202 will be better able to handle an input variable x with no values or fewer values than the number of nodes in the input layer 302. The stochastic mask may consist of binary variables (e.g., 0 and 1), which may be set randomly, or may be set following an empirical probability that the data for the time series will be unavailable.

In an example embodiment, a latent distribution z may use any suitable type of probability distribution that may maximize the variational lower bound. The latent distribution z may use multiple different types of probability distributions, for example, in relation to different underlying features in the input data. Typically, features may be best represented by a Gaussian distribution, but in an example embodiment, a temporally-based feature may be represented by a Poisson distribution, and/or a spatially-based feature may be represented by a Rayleigh distribution.

Figure 6:
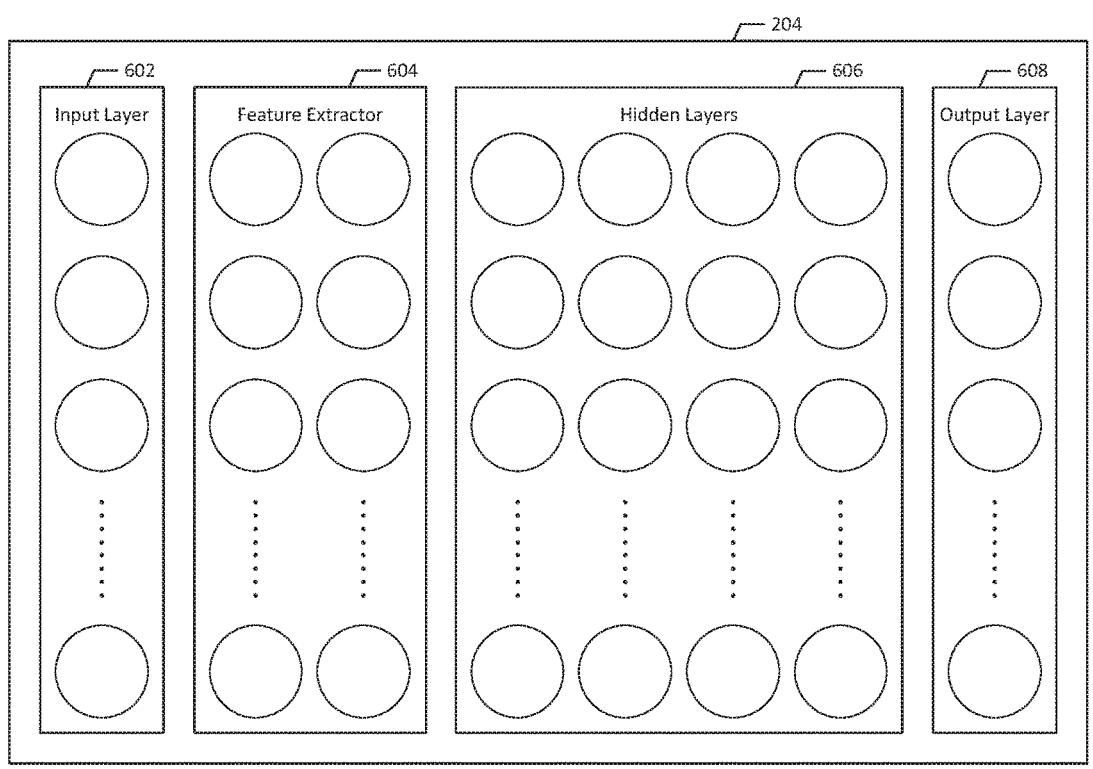
FIG. 6 is a high-level block diagram of a sequential data forecast machine, according to an example embodiment of the present disclosure.

FIG. 6 is a high-level block diagram of a sequential data forecast machine 204, according to an example embodiment of the present disclosure. A sequential data forecast machine 204 includes an input layer 602, a feature extractor 604, a plurality of hidden layers 606, and an output layer 608, which may output sequential data forecast values based on the data input into the sequential data forecast machine 204. In an example embodiment, the input layer 602 has 8 nodes and receives the input variable x, which is an 8-tuple, so each node receives a value of one element of the 8-tuple at each time interval. For example, the input variable x may be the time series data values output from a data collection device 104 (e.g., an ultrasound sensor). The data received in the input layer 602 is provided to the feature extractor 604, which may include a plurality of nodes in one or more layers. The feature extractor 604 may be structured as a neural network or the like. The output of the feature extractor 604 is provided to the hidden layers 606 of the sequential data forecast machine 204. In an example embodiment, the sequential data forecast machine 204 does not include any feature extractor 604; however, typically, a feature extractor 604 may improve the accuracy of the sequential data forecast machine 204. For example, a feature extractor 604 may remove noise and/or highlight desired features in the input variable x, which may generally tend to improve the signal to noise ratio. The hidden layers 606 may be provided in the form of a neural network or the like, for example with weighted links between nodes of different layers. The hidden layers 606 perform sequential data forecasting or prediction. For example, the hidden layers 606 may be structured to forecast the immediate future values of an input variable x. The hidden layers 606 maintain a hidden state h at all times, and the hidden state is iteratively updated as new input data is received. For example, the hidden state h may be defined by the values of 32 nodes based on 4 hidden layers, each having 8 nodes. At each time interval, the hidden state $h_{t-1}$ is updated to the hidden state $h_t$. The output of the nodes in the hidden layers 606 is provided to the output layer 608. For example, the output layer 608 may output a prediction of the forecast input $x_{t+1}$, for the input variable x at the next time interval, i.e., at time t+1. The output layer 608 may have 8 nodes, which provide an 8-tuple of the forecast input $x_{t+1}$. Thus, at each time interval, the sequential data forecast machine 204 is structured to forecast the next input variable using the hidden state $h_{t-1}$.

It should be appreciated that the specific node structure illustrated in FIG. 6 is merely a non-limiting example, and for example, a sequential data forecast machine 204 may include an input layer 602 with any suitable quantity of nodes, any suitable feature extractor 604 or no feature extractor 604, any suitable quantity of the hidden layers 606, and each hidden layer may have any suitable number of nodes and any suitable structure of connections between nodes, and any suitable quantity of nodes in the output layer 608. A sequential data forecast machine 204 may implement any suitable structure (e.g., a recurrent neural network (RNN), a long short term memory (LSTM) network, a recurrent multilayer perceptron (RMLP), a second order RNN, a hidden Markov model (HMM)). For example, the sequential data forecast machine 204 may typically be an RNN, which includes a plurality of nodes, which may be respectively structured in one or more hidden layers. In an example embodiment, the RNN hidden layers may be fully connected. The feature extractor nodes may be a part or subset of the hidden state or may be separate from the hidden state.

Figure 7:
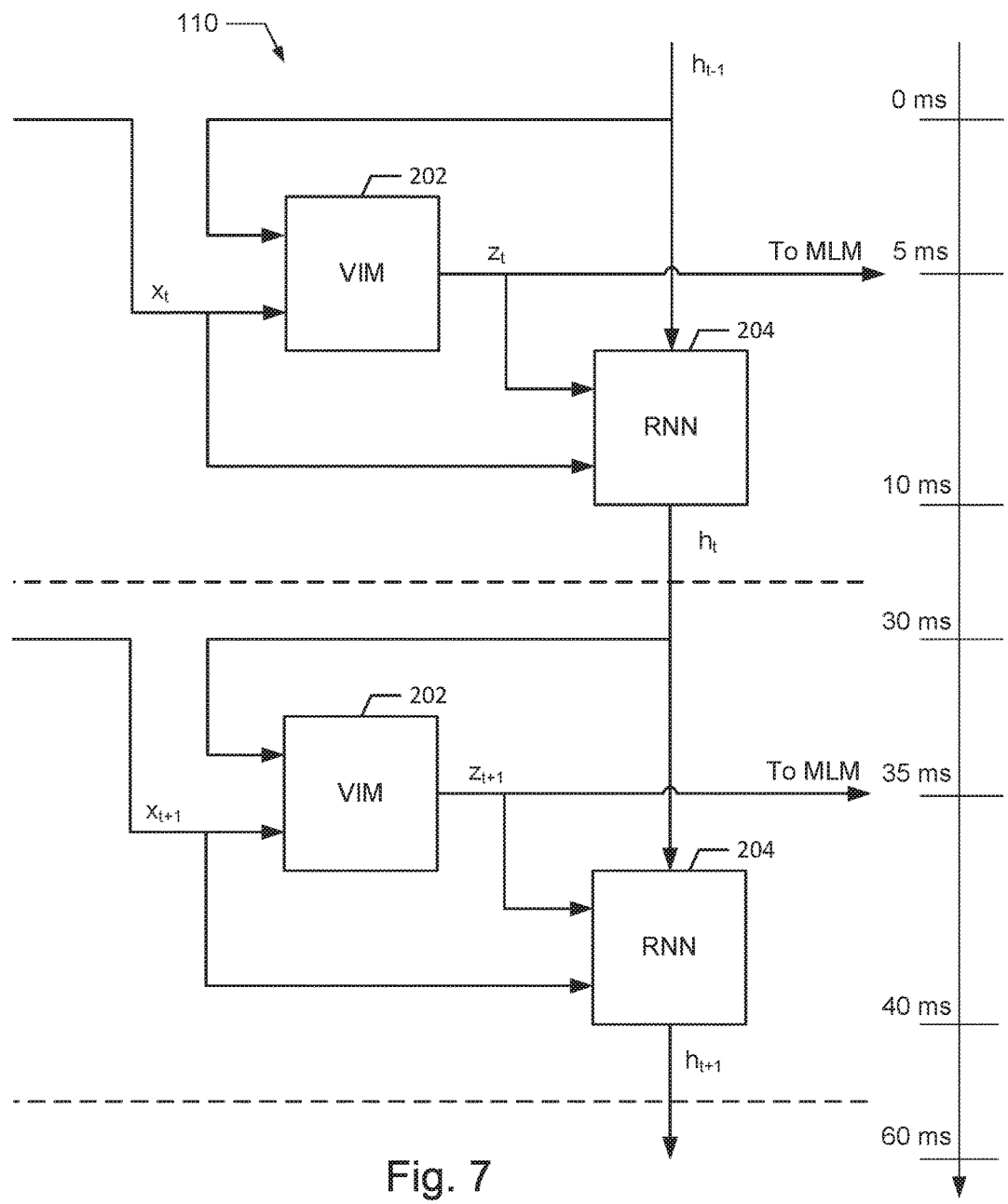
FIG. 7 is a flow diagram illustrating time series data adaptation, according to an example embodiment of the present disclosure.

FIG. 7 is a flow diagram illustrating time series data adaptation, according to an example embodiment of the present disclosure. An example time series data adaptation module 110 includes a variational inference machine 202 and a sequential data forecast machine, which is designated as RNN 204. FIG. 7 illustrates an iterative process which occurs starting at 0 msec, with a 30 msec time interval. For example, ultrasound sensor time series data $x_t$ may be received every 30 msec, as indicated by the entry of the signal $x_t$ at 0 msec and 30 msec from the left hand side of the flow diagram. The inputs in FIG. 7 are shown as received from the left side, while outputs are output from the right side. The dotted lines indicate a next time interval beginning. A time interval may be dictated, for example, by a sampling time of a data collection device 104 (e.g., an ultrasound sensor, a video image sensor, a lidar sensor), and/or a processing time of a variational inference machine 202, sequential data forecast machine 204, and/or a machine learning model 206.

As shown in FIG. 7, the time series data $x_t$ and the hidden state $h_{t-1}$ are received at 0 msec, and these are both input into the input layer of variational inference machine 202, which outputs a latent distribution $z_t$ at 5 msec. The hidden state may be input into the variational inference machine 202 as an n-tuple variable $h_{t-1}$ in parallel with the input variable $x_t$, as discussed in further detail below. The latent distribution $z_t$ is infused with time dependency information from the hidden state $h_{t-1}$, which maintains time dependencies from time t-1 and earlier. The time dependency infused latent distribution $z_t$ may be provided to a machine learning model 206 in the machine learning module 108. In an example embodiment, immediately upon being output from the variational inference machine 202, the time dependency infused latent distribution $z_t$ is provided directly to a machine learning model 206. In time critical real-time systems, it may be important to provide the time dependency infused latent distribution $z_t$ that is representative of the time series data $x_t$ as quickly as possible. In another example embodiment, the time dependency infused latent distribution $z_t$ is further adapted or converted in form before being input into a machine learning model 206.

The RNN 204 receives as inputs the time dependency infused latent distribution $z_t$ and the real time data $x_t$; however, the current time dependency infused latent distribution $z_t$ is not yet generated at 0 msec. Accordingly, the RNN 204 may wait for the time dependency infused latent distribution $z_t$ to be output from variational inference machine 202, for example, at 5 msec after the time series data $x_t$ was obtained. Then, the time dependency infused latent distribution $z_t$ and the real time data $x_t$ are both input in parallel into the input layer of RNN 204, which updates the hidden state $h_{t-1}$ obtained from the previous time interval to $h_t$ at 10 msec, for example. Once the updated hidden state $h_t$ is generated, it may be exported from the RNN 204 and provided to the variational inference machine 202 as an input at the next time interval (e.g., at 30 msec). The data being exported from the hidden layers 606, as opposed to being output from the output layer 608 at the right side of the RNN 204, is indicated by the hidden state $h_t$ being exported from the bottom of the RNN 204 as illustrated in FIG. 7. Likewise, the hidden layers 606 obtaining the current version of the hidden state $h_t$ is indicated by the hidden state $h_t$ being provided to the top of the RNN 204, as opposed to being input into the left side of the RNN 204 at the input layer 602.

The process shown in FIG. 7 may iteratively occur while real time data x is being collected (e.g., while a vehicle is turned on). At each time interval, the time series data $x_t$ may represent a single temporal moment in time that provides no time context and includes no time dependencies. At each time interval, a time dependency infused latent distribution $z_t$ may be output from the variational inference machine 202 and/or provided directly or indirectly to a machine learning model 206 (e.g., at 5 msec, 35 msec, 65 msec). Even when the time series data $x_t$ is temporarily unavailable, for example, due to sensor error or due to a communication channel delay, an updated time dependency infused latent distribution $z_t$ may still be output from the variational inference machine 202 for input to a machine learning model 206, because the time dependencies maintained within the hidden state $h_{t-1}$ enable the time dependency infused latent distribution $z_t$ to be updated as necessary. Thus, the structure of FIG. 7 is robust to intermittently missing time series data x, for one or more time intervals. The time dependency infused latent distribution $z_t$ may continue to provide an accurate distributed representation of the time series data x to a machine learning model 206 for as long as the time dependencies of the system being sensed are maintained by the system (e.g., 300 msec, 1 second, 2 seconds, 3 seconds). It should be appreciated that the illustrated time interval of 30 msec is merely exemplary, and may be adjusted based on the data collection device(s) 104, system throughput, system requirements, and the like.

Figure 8:
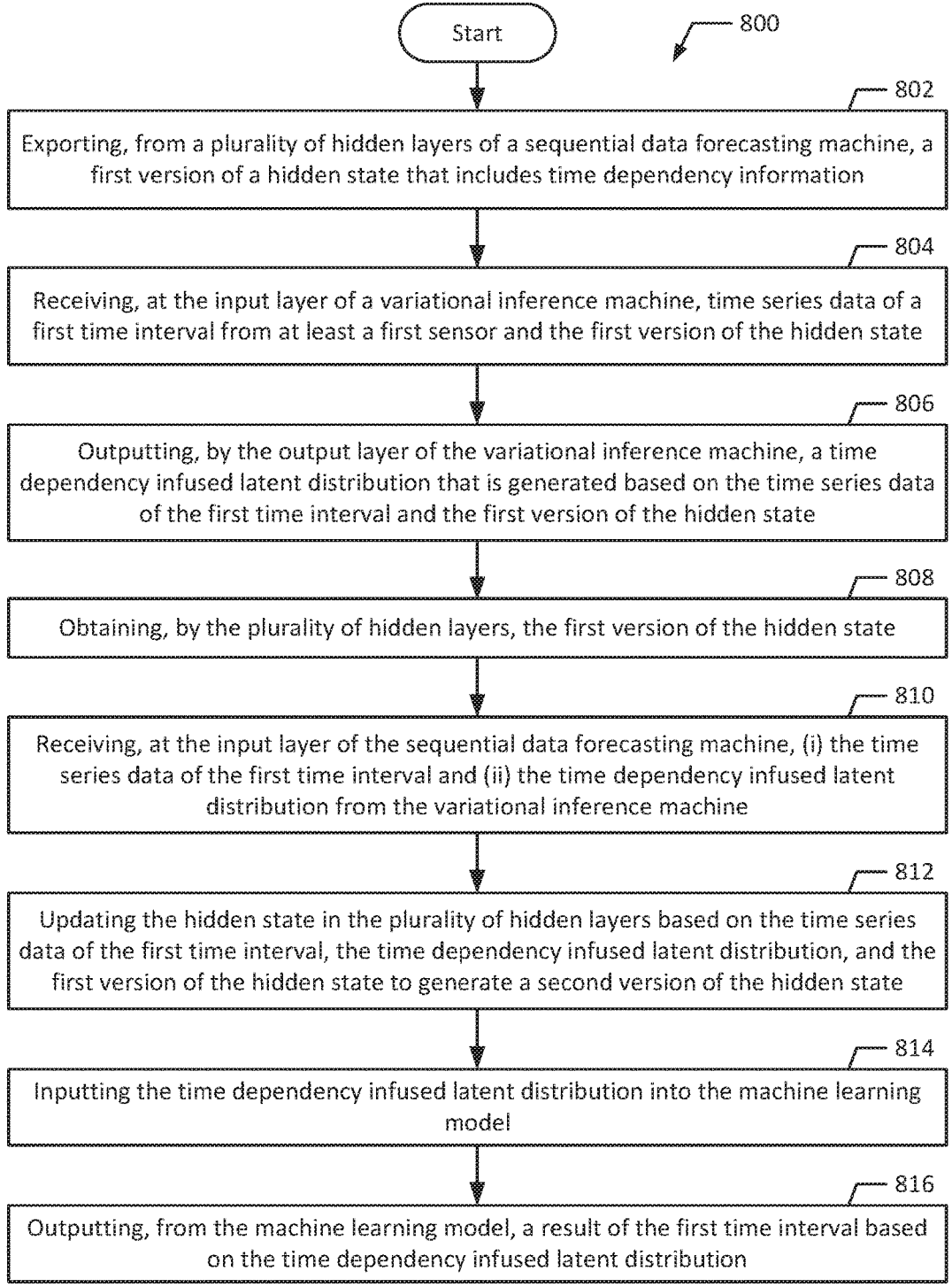
FIG. 8 is a flowchart illustrating an example process of time series data adaptation, according to an example embodiment of the present disclosure.

FIG. 8 is a flowchart illustrating an example process for time series data adaptation, according to an example embodiment of the present disclosure. Although the process 800 is described with reference to the flowchart illustrated in FIG. 8, it will be appreciated that many other methods of performing the acts associated with the process 800 may be used. For example, the order of some of the blocks may be changed, certain blocks may be combined with other blocks, certain blocks may be iteratively performed or repeated, and some of the blocks described are optional.

The example process 800 may begin with exporting, from a plurality of hidden layers of a sequential data forecast machine, a first version of a hidden state that includes time dependency information (block 802). In an example embodiment, the sequential data forecast machine 204 is a recurrent neural network (RNN), for example, as illustrated in FIG. 7. The hidden state may be $h_{t-1}$ from a previous time interval, which was based on time series data from an ultrasound sensor at time t−1, in addition to earlier time series data via time dependencies maintained in the hidden state. The first version of the hidden state may include a value for each respective node within the hidden state of the RNN. In an example embodiment, the RNN may have 14 input nodes and 4 hidden layers (e.g., fully connected) with 56 nodes in the hidden state. In an example embodiment, the values from a feature extractor are not included in the first version of the hidden state. Normally, an RNN only outputs values from the output layer, and does not output values from the hidden layers. Specifically, the RNN normally maintains the hidden state internally, only using the values in the nodes of the hidden layers to generate the output values while internally maintaining the hidden state across time intervals or sequential intervals. Accordingly, as described herein, the information in the hidden layers is exported from the RNN, in contrast to outputting values from the output layer. In an example embodiment, the first version of the hidden state may include values from a subset of the hidden layers, for example, if some hidden layers are not required to provide time dependency information. Thus, the first version of the hidden state may be a partial hidden state that is missing certain nodes that may not include significant time dependencies.

The example process 800 may continue with receiving, at the input layer of a variational inference machine, time series data of a first time interval from at least a first sensor and the first version of the hidden state (block 804). For example, the time series data may be $x_t$ the ultrasound sensor data at time t, and the first version of the hidden state $h_{t-1}$ is all the values of all nodes of the RNN at time t−1. Thus, the first version of the hidden state was generated at the previous time interval (t−1) and is the current version of the hidden state when input into the input layer of the variational inference machine. In an example embodiment, the input layer of the variation inference machine may receive an 8-tuple as the time series data $x_t$ (e.g., ultrasound sensor data) and a 56-tuple as the first version of the hidden state $h_{t-1}$. In an example embodiment, one or more feature extractors may be implemented to extract features or condition the time series data and/or the first version of the hidden state.

The example process 800 may continue with outputting, by the output layer of the variational inference machine, a time dependency infused latent distribution that is generated based on the time series data of the first time interval and the first version of the hidden state (block 806). For example, the time series data $x_t$ includes only static ultrasound levels from time t, and the time dependencies from the hidden state $h_{t-1}$ of the RNN are infused into the time series data $x_t$ by hidden layers of the variational inference machine to form the time dependency infused latent distribution $z_t$. In an example embodiment, the time dependency infused latent distribution $z_t$ may be a set of distributions, each defined by a mean and a standard deviation. The set of distributions includes time dependency information from the hidden state $h_{t-1}$ that is infused into the time series data at the first time interval. The outputting of the time dependency infused latent distribution may iteratively occur at each time interval, for example, after updated time series data $x_t$ is received. The output time dependency infused latent distribution $z_t$ may be directly used by a machine learning model or further processed within the time series data adaptation module 110, as discussed in more detail below. Also, in an example embodiment, the time dependency infused latent distribution z may be input into a variational generation machine to output $\hat{x}$, which may be used to validate the variational inference machine.

The example process 800 may continue with obtaining, by the plurality of hidden layers, the first version of the hidden state (block 808). For example, at time t, the hidden layers of the RNN obtain the first version of the hidden state from time t−1, which enables the hidden layers to maintain time dependencies beyond the current time interval being considered, across time intervals (e.g., from t−100 to t), within the hidden state. For example, with a time interval of 30 msec, a typical time dependency in an exemplary system may last for approximately 3 seconds or about 100 time intervals. The time dependencies maintained within the hidden state may be linear and/or nonlinear. The hidden state may maintain time dependencies for any number of time intervals depending upon the features present within the time series. In other words, the hidden state may contain the temporal structure or the time context of the time series.

The example process 800 also includes receiving, at the input layer of the sequential data forecast machine, the time series data of the first time interval and the time dependency infused latent distribution from the variational inference machine (block 810). For example, the input layer of an RNN may receive an 8-tuple as the time series data $x_t$ (e.g., ultrasound sensor data) and a 6-tuple as the time dependency infused latent distribution $z_t$. In an example embodiment, one or more feature extractors may be implemented to extract features or condition the time series data and/or the time dependency infused latent distribution.

The example process 800 may continue with updating the hidden state in the plurality of hidden layers based on the time series data of the first time interval, the time dependency infused latent distribution, and the first version of the hidden state to generate a second version of the hidden state (block 812). For example, the RNN uses the input time series data $x_t$ (e.g., 8-tuple of ultrasound sensor data), the input time dependency infused latent distribution $z_t$ (e.g., 6-tuple), and the 56 values of the 56 nodes in the hidden layers (e.g., 4 hidden layers) of the hidden state $h_{t-1}$ to result in an updated hidden state $h_t$. The updated hidden state $h_t$ continues to maintain time dependencies and updates the time dependencies according to the structure of the RNN. The updating of the hidden state may iteratively occur at each time interval, for example, after updated time series data $x_t$ is received and after the time dependency infused latent distribution $z_t$ is updated, to maintain time dependencies throughout time. In an example embodiment, the output layer of the RNN may also provide a result based on the input data and the hidden state. The result may include a prediction of the time series data at the next time interval (e.g., $x_{t+1}$), which may be used to validate the RNN time dependencies in the hidden state.

The example process 800 may also include inputting the time dependency infused latent distribution into the machine learning model (block 814). For example, the time dependency infused latent distribution $z_t$ that is output from the variational inference machine is input into a collision avoidance machine learning model that uses the ultrasound sensor time series data to detect whether a collision may be imminent. In an example embodiment, a machine learning model is a forecasting model (e.g., autoregressive integrated moving average) or a detection or classification model (e.g., support vector machine, random forest). In an example embodiment, the time dependency infused latent distribution $z_t$ is input into the machine learning model immediately upon being output from the variational inference machine.

The example process 800 continues with outputting, from the machine learning model, a result of the first time interval based on the time dependency infused latent distribution (block 816). For example, the machine learning model may output a result indicating that a collision is imminent, which causes an instruction to be sent to one or more actuators to take action, such as braking or steering of a vehicle, actuating an alert and/or an alarm of a vehicle's user interface for a driver, or the like. The result may allow corrective or precautionary action to be taken automatically and/or via user intervention. The outputting of a result from the machine learning model may iteratively occur at each time interval (e.g., every 30 msec) to continually provide any necessary or desirable actuations.

Figure 9:
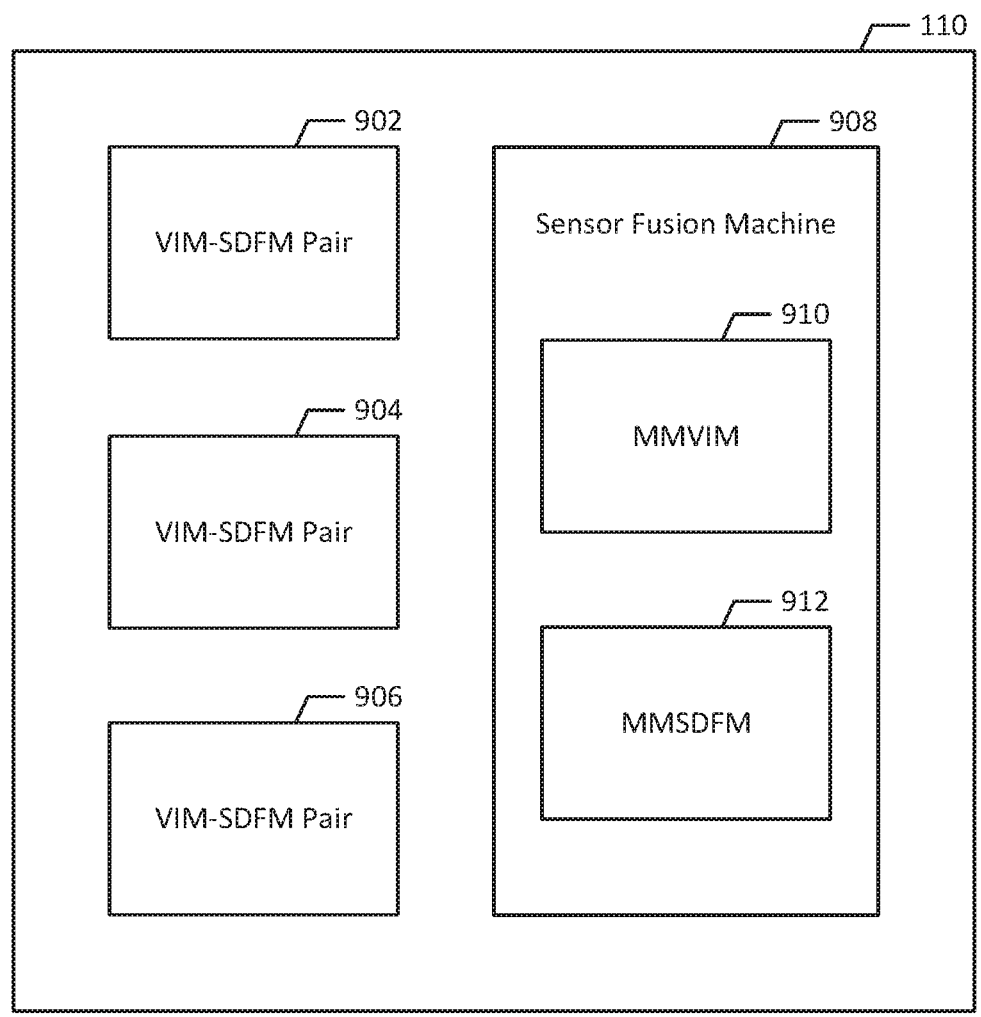
FIG. 9 is high-level block diagram of a time series data adaptation module, according to an example embodiment of the present disclosure.

FIG. 9 illustrates a high-level block diagram of a time series data adaptation module 110, which is configured to perform sensor fusion, according to an example embodiment of the present disclosure. A plurality of sequential data forecast machine pairs (VIM-SDFM pairs) 902, 904, 906, each respectively include a variational inference machine 202 and a sequential data forecast machine 204. For example, the VIM-SDFM pair 902 may receive lidar sensor time series data $x_{1t}$ and output a time dependency infused latent distribution $z1_t$, the VIM-SDFM pair 904 may receive radar sensor time series data $x2_t$ and output a time dependency infused latent distribution $z2_t$, the VIM-SDFM pair 906 may receive ultrasound sensor time series data $x3_t$ and output a time dependency infused latent distribution $z3_t$. The sensor fusion machine 908 includes a multi-modal variational inference machine 910 and a multi-modal sequential data forecast machine 912. The sensor fusion machine 908 fuses data of different data types to form more robust, information-rich data types that are better suited for producing reliable, accurate, precise and/or quick recognition results in machine learning analysis or the like. The sensor fusion machine 908 may be particularly advantageous for providing a multi-modal time dependency infused latent distribution that is robust to permanently and/or intermittently unavailable data.

A system that uses multi-modal sensor fusion includes a plurality of different sensors measuring and/or detecting different real world properties, for example, speed of moving vehicle, distances to other objects, road grade, road cant, tire pressure, brake pad wear, rain detection, etc. All of these factors may have an impact on a real world result based on a physical actuation, such as stopping a car, but each modality may also be different and independent of one another. Clearly, speed has a significant role in how long a car will take to stop, but each one of these modalities can impact whether the car can stop within a predetermined distance (e.g., 75 feet). Moreover, each one of these modalities may have one or more sensors that contribute information that can be used to determine whether the car will be able to stop within some predetermined distance (e.g., before rear-ending another vehicle). Using the sensor fusion machine 908 to fuse different types of data may provide an information rich multi-modal time dependency infused latent distribution that may be particularly robust to unavailable sensor data, including both intermittently missing data (brief sensor malfunction due to interference, noise, or conditions such as direct sunlight), and permanently missing data (e.g., the sensor is broken or never installed on a vehicle). In an example embodiment, a sensor fusion machine 908 may be provided on a server that is in communication with an edge device 100.

Figure 10:
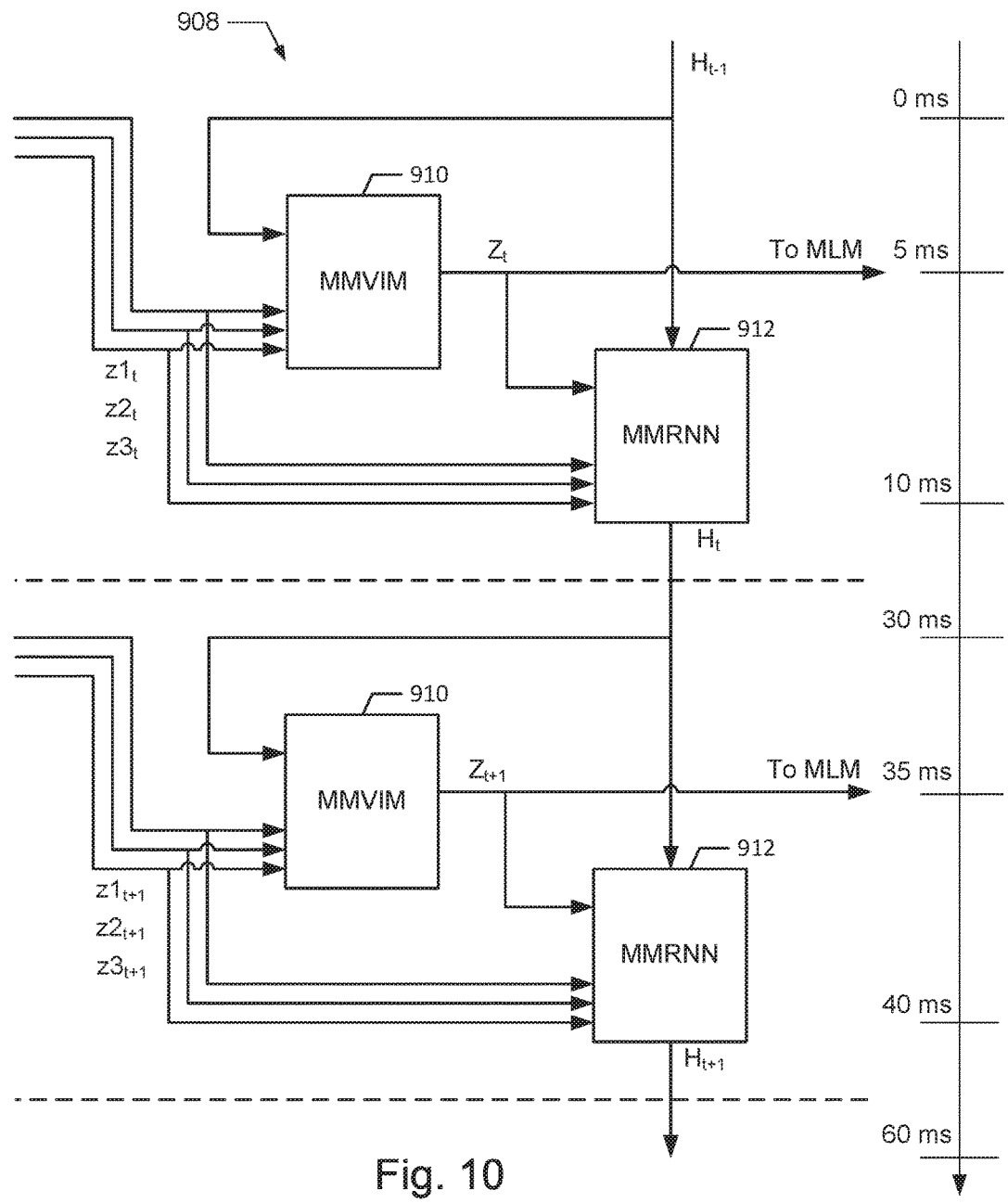
FIG. 10 is a flow diagram illustrating time series data adaptation including sensor fusion, according to an example embodiment of the present disclosure.

FIG. 10 is a flow diagram illustrating time series data adaptation including sensor fusion, according to an example embodiment of the present disclosure. In this example embodiment, the sensor fusion machine 908 includes a multi-modal variational inference machine (MMVIM) 910 and a multi-modal recurrent neural network (MMRNN) 912, both of which receive multiple modalities of data as inputs (i.e., data from multiple different domains), to provide a multi-modal sensor fusion output.

The sensor fusion machine 908 may receive the time dependency infused latent distributions $z1_t$, $z2_t$, and $z3_t$, for example, from the VIM-SDFM pairs 902, 904, 906. For example, the time dependency infused latent distributions $z1_t$, $z2_t$, $z3_t$ and a first version of the multi-modal hidden state $H_{t-1}$ may be input in parallel into the input layer of MMVIM 910. For example, each of the time dependency infused latent distributions $z1_t$, $z2_t$, $z3_t$ may be a 6-tuple, and the multi-modal hidden state $H_{t-1}$ may be a 96-tuple. Accordingly, the input layer of the MMVIM 910 may include 114 input nodes. An input layer to any variational inference machine 202, 910 may include sublayers for each different type of data that are input in parallel (e.g., $H_{t-1}$, $z1_t$, $z2_t$, and $z3_t$). The output layer of the MMVIM 910 outputs a multi-modal time dependency infused latent distribution $Z_t$. The multi-modal time dependency infused latent distribution $Z_t$ may be a 6-tuple (e.g., three sets of latent distributions). As described herein, referencing a variable using capitals specifically designates a multi-modal variable (e.g., multi-modal time dependency infused latent distribution Z and multi-modal hidden state H). The multi-modal time dependency infused latent distribution $Z_t$ may be provided as an input to a machine learning model 206 (e.g., a collision avoidance model). If any of the sensors (e.g., ultrasound, radar, lidar, video) used to generate any of the time dependency infused latent distributions $z1_t$, $z2_t$, $z3_t$ becomes intermittently unavailable, the multi-modal time dependency infused latent distribution $Z_t$ may advantageously be robust to the unavailable sensor data based on multi-modal time dependencies maintained in the multi-modal hidden state $H_{t-1}$.

The input layer of the MMRNN 912 receives the multi-modal time dependency infused latent distribution $Z_t$ and the time dependency infused latent distributions $z1_t$, $z2_t$, $z3_t$, which are input in parallel into the input layer of the MMRNN 912, which updates the multi-modal hidden state $H_{t-1}$ obtained from the previous time interval to $H_t$. The input layer of the MMRNN 912 may include 24 nodes (e.g., where each of $Z_t$, $z1_t$, $z2_t$, $z3_t$ is a 6-tuple). The updated multi-modal hidden state $H_t$ is then exported to the input layer of the MMVIM 910 at the next time interval, and the process may continue iteratively updating the multi-modal hidden state H and the multi-modal time dependency infused latent distribution Z, which is provided to the machine learning model during each time interval. In an example embodiment, one or more feature extractors may be implemented to extract features or condition any of the inputs of the MMRNN 912 and/or the MMVIM 910.

The multi-modal time dependency infused latent distribution Z is not necessarily smaller in dimensionality than each time dependency infused latent distribution z that is input into the MMVIM 910, and may typically be larger for systems fusing a large number of time dependency infused latent distributions z (e.g., for 300 time series). Although, typically, a multi-modal time dependency infused latent distribution Z would be smaller than the cumulative dimensionality of all component time dependency infused latent distributions z combined together.

In an example embodiment, the time series data adaptation module 110 and/or the machine learning module 108 may be provided in a server (e.g., an intermediate server) or other computing device that is not an edge device 100. For example, an intermediate server may communicate with a plurality of edge devices 100 via a network, where each edge device provides a one or more time dependency infused latent distributions or one or more collected time series. In an example embodiment, the time series data adaptation module 110 and/or the machine learning module 108 may be provided in a cloud computing environment or be in the cloud.

Figure 11:
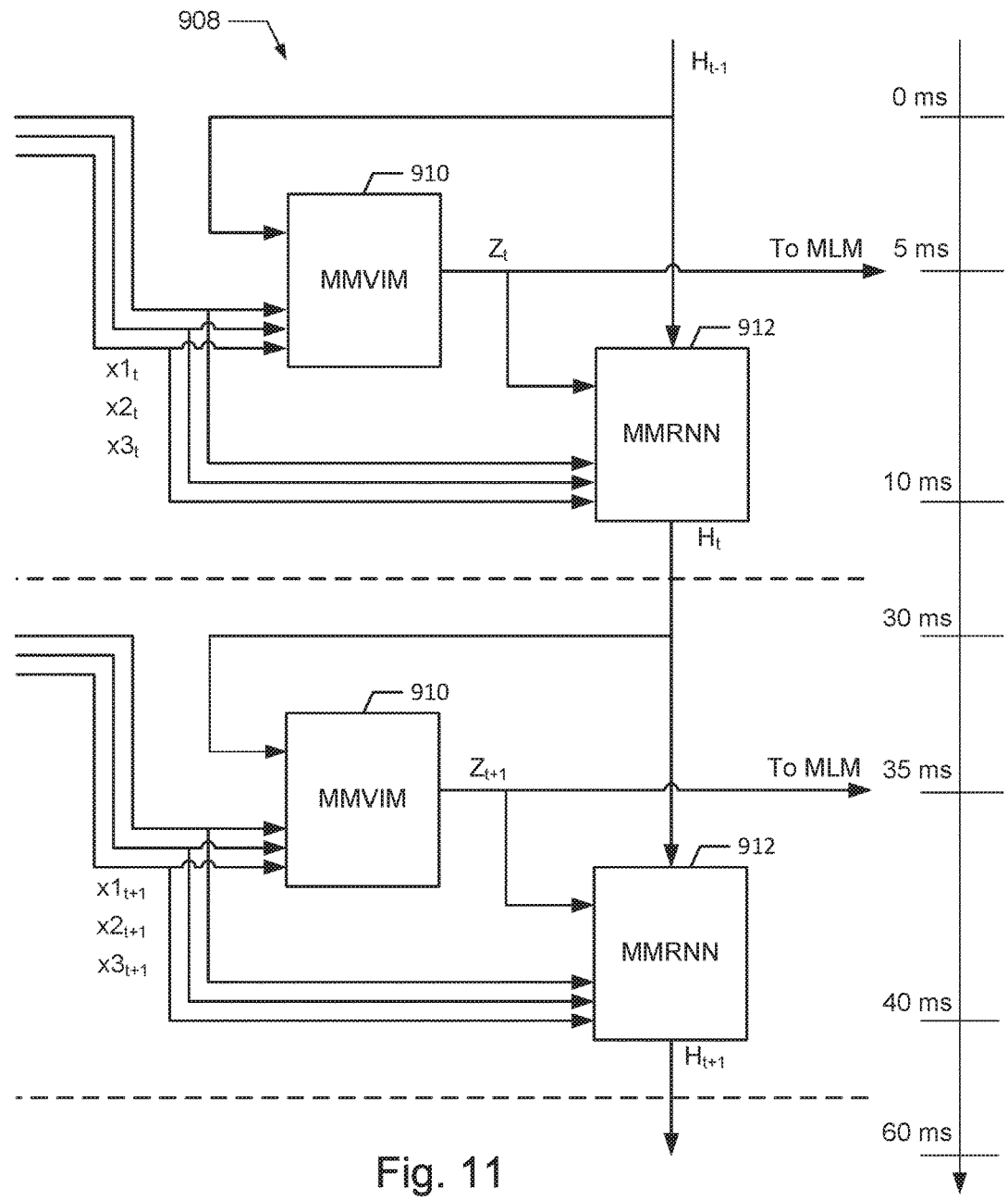
FIG. 11 is a flow diagram illustrating time series data adaptation including sensor fusion, according to an example embodiment of the present disclosure.

FIG. 11 is a flow diagram illustrating time series data adaptation including sensor fusion, according to an example embodiment of the present disclosure. The sensor fusion machine 908 may receive the time series data $x1_t$, $x2_t$, and $x3_t$, for example, from the data collection devices 104a, 104b, 104c. For example, the time series data $x1_t$, $x2_t$, $x3_t$ and a first version of the multi-modal hidden state $H_{t-1}$ may be input in parallel into the input layer of MMVIM 910. For example, each of the time series data $x_{1t}$, $x_{2t}$, and $x_{3t}$ may be an 8-tuple, and the multi-modal hidden state $H_{t-1}$ may be a 120-tuple. Accordingly, the input layer of the MMVIM 910 may include 144 input nodes. The output layer of the MMVIM 910 outputs a multi-modal time dependency infused latent distribution $Z_t$. The multi-modal time dependency infused latent distribution $Z_t$ may be a 6-tuple (e.g., three sets of latent distributions). The multi-modal time dependency infused latent distribution $Z_t$ may be provided as an input to a machine learning model 206 (e.g., a COPD risk assessment model). If any of the sensors (e.g., a blood oxygen sensor, a blood pH sensor, an oxygen metabolism sensor, a pulse oximetry sensor, a spirometer, a peak flow detector, a respiration sensor, a smoke sensor) that are used to generate any of the time series data $x1_t$, $x2_t$, $x3_t$, becomes unavailable, the multi-modal time dependency infused latent distribution $Z_t$ may advantageously be robust to the unavailable sensor data based on multi-modal time dependencies maintained in the multi-modal hidden state $H_{t-1}$.

The input layer of the MMRNN 912 receives the multi-modal time dependency infused latent distribution $Z_t$ and the time series data $x1_t$, $x2_t$, $x3_t$, which are input in parallel into the input layer of the MMRNN 912. The MMRNN 912 updates the multi-modal hidden state $H_{t-1}$ obtained from the previous time interval to $H_t$. The input layer of the MMRNN 912 may include 30 nodes (e.g., where $Z_t$ is a 6-tuple and each of $x1_t$, $x2_t$, $x3_t$ is an 8-tuple), and the multi-modal hidden state H may include 120 nodes (e.g., where there are 4 hidden layers). The updated multi-modal hidden state $H_t$ is then exported to the input layer of the MMVIM 910 at the next time interval, and the process may continue iteratively updating the multi-modal hidden state H and the multi-modal time dependency infused latent distribution Z, which is provided to the machine learning model 206 during each time interval.

In an example embodiment, the different time series data is received at varying different time intervals, for example, based on different sample times of different sensors. The different sample times may be regular or irregular. As illustrated in the table below, the time series data x1, x2, x3 from each sensor may not be received at each time interval. For example, a time series value for x1 may be received at every time interval, while a time series value for x2 may be received every other time interval (e.g., at $t_0$, $t_2$, $t_4$, $t_6$), and a time series value for x3 may be received every third time interval (e.g., at $t_0$, $t_3$, $t_6$).

TABLE 1

| $t_0$ | $t_1$ | $t_2$ | $t_3$ | $t_4$ | $t_5$ | $t_6$ |
|---|---|---|---|---|---|---|
| {x1, x2, x3} | {x1} | {x1, x2} | {x1, x3} | {x1, x2} | {x1} | {x1, x2, x3} |

Accordingly, as shown above, many time intervals will include one or more unavailable time series (e.g., x2 or x3). However, the multi-modal time dependency infused latent distribution Z will be robust to this missing sensor input data based on the time dependencies maintained within the multi-modal hidden state H. Also, in some cases, when multiple different time series are irregular, the data values may be unsynchronized. For example, different data collection devices 104 may be triggered by different external events to take measurements, resulting in an unsynchronized time series where missing data values are treated as unavailable. In an unsynchronized time series, in some cases, most or all of the time series data will routinely be unavailable. In an example embodiment, unsynchronized time series data may be aligned to a time interval start time, which may include extrapolating an unsynchronized input value.

The sensor fusion machine 908 that is structured as illustrated in FIG. 11 may advantageously retain low-level interaction between different modalities of data. For example, sensor fusion of raw time series data x1, x2, x3, etc. may be most useful if there are a relatively small number of different time series modalities and/or if one or more of the time series are sparse and insufficient for a generating a suitable time dependency infused latent distribution z.

As discussed above, stochastic masks may be used for training, which may remain particularly advantageous for multi-modal sensor fusion as provided by the sensor fusion machine 908. For example, in a system with three time series, a stochastic mask may consist of three binary variables, $b_1$, $b_2$, $b_3$. When the stochastic mask is added to the input data (e.g., time series data), the input takes the form: ($b_1 x1$, $b_2 x2$, $b_3 x3$, $b_1$, $b_2$, $b_3$) where $b_1$, $b_2$, $b_3$ take the values 0 or 1. The values of $b_1$, $b_2$, $b_3$ may be set randomly, or they may be set following the empirical probability that the corresponding time series is absent in training data set.

If the values of x1, x2, x3 are binary, they may be coded as −1 and 1, rather than the standard coding as 0 and 1. If the values of x1, x2, x3 are continuously-valued with a range that includes 0, the values may be adjusted such that the range no longer includes 0. In both cases, this allows 0 to be used as the missing value. The activation value y for node S1 in the second layer is:

$$y_{S1} = w_1 b_1 x1 + w_2 b_2 x2 + w_3 b_3 x3 + w_4(1-b_1) + w_5(1-b_2) + w_6(1-b_3) + \beta$$

where $w_n$ is the weight of the connection between input node n and node S1 and $\beta$ is a standard bias term. The terms $w_4(1-b_1)$, $w_5(1-b_2)$, and $w_6(1-b_3)$ are offset terms. In many cases, the different input time series will have different scales and it may not be possible to normalize these data before training a neural network or the like. The offset terms function to keep the activation value y in the same scale, even when input values are missing.

In order to train for a missing value of x1, for example, $b_1$ is set to 0. For the forward pass in backpropagation, no special technique is necessary because the 0 value of $w_1 b_1 x1$ will not contribute to the activation of the next layer. For the backward pass, however, the error should not be propagated to the input node that received x1. This node may be marked with a temporary flag, which signals that it should be disconnected during the backward pass. The stochastic mask training as described above may advantageously minimize the effect of a 0 (e.g., during sensor failure) on a final output. For example, when a trained variational inference machine is deployed, a value of 0 may be used for all missing values. Also, stochastic masking may similarly be used for training with time series data and/or time dependency infused latent distributions in any sensor fusion system, for example, as discussed above in relation to FIG. 10, or as described in the various structures discussed below.

Figure 12:
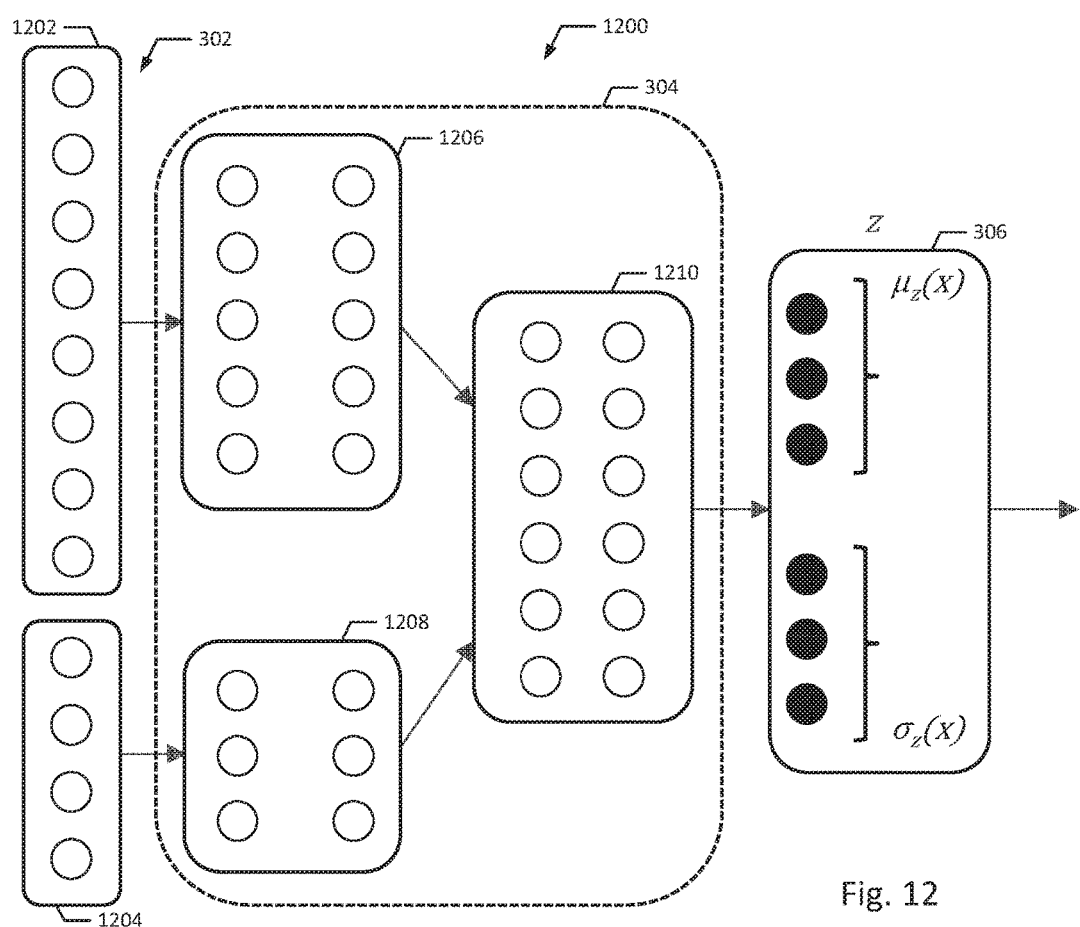
FIG. 12 is high-level block diagram of a variational inference machine, according to an example embodiment of the present disclosure.

In an example embodiment, one or more feature extractors may be implemented to extract features or condition any of the inputs of the MMRNN 912 and/or the MMVIM 910. FIG. 12 illustrates an exemplary structure of feature extractors as provided within a variational inference machine such as MMVIM 910. FIG. 12 is high-level block diagram of a variational inference machine 1200, according to an example embodiment of the present disclosure. The input layer 302 of the variational inference machine 1200 may include sublayers 1202 and 1204. Inputs received at sublayer 1202 are provided to feature extractor 1206, which then provides outputs to hidden layers 1210. Likewise, inputs received at sublayer 1204 are provided to feature extractor 1208, which then provides outputs to hidden layers 1210, which outputs a time dependency infused latent distribution z from output layer 306. As discussed above with regard to FIG. 6, feature extractors may be may include a plurality of nodes in one or more layers, which may be structured as a neural network or the like. In many cases, use of feature extractors 1206 and 1208 may allow the hidden layers 1210 to operate more quickly, more efficiently, and/or more accurately. Feature extractors 1206, 1208 may be used in any variational inference machine or sequential data forecast machine.

Each of sublayers 1202 and 1204 may include one or more nodes, and additional sublayers could also be provided for additional data types, such as a third type, fourth type, etc. For example, the sublayer 1202 receives hidden state data (e.g., $h_{t-1}$, $H_{t-1}$, $h2_{t-1}$, $h3_{t-1}$) and the sublayer 1204 receives time series data and/or latent distribution data. Time series data input into sublayer 1204 may be a single modality of data (e.g., input variable x of FIG. 7) or multiple modalities of data (e.g., input variables x1, x2, x3 of FIG. 11). Latent distribution data input into sublayer 1204 may include one or multiple modalities of data such as time dependency infused latent distributions z1, z2, z3 or a multi-modal time dependency infused latent distribution(s) Z. Thus, the feature extractors 1206 and 1208 may be single-modal or multi-modal. In an example embodiment, each particular type of data (e.g., each of input variables x1, x2, x3) has its own feature extractor 1208. For example, multiple different variational inference machines may use a common data type (e.g., ultrasound data), so a common feature extractor 1208 may be used in the different variational inference machines. In an example embodiment, one or both of the feature extractors 1206 and 1208 may be omitted from the hidden layers 304. For example, a feature extractor 1206 may be unnecessary, so hidden state h inputs received at sublayer 1202 may be provided directly to hidden layers 1210. For example, a feature extractor 1208 may be omitted for the input of time dependency infused latent distributions z1, z2, z3, for example, as described in FIG. 10.

Figure 13:
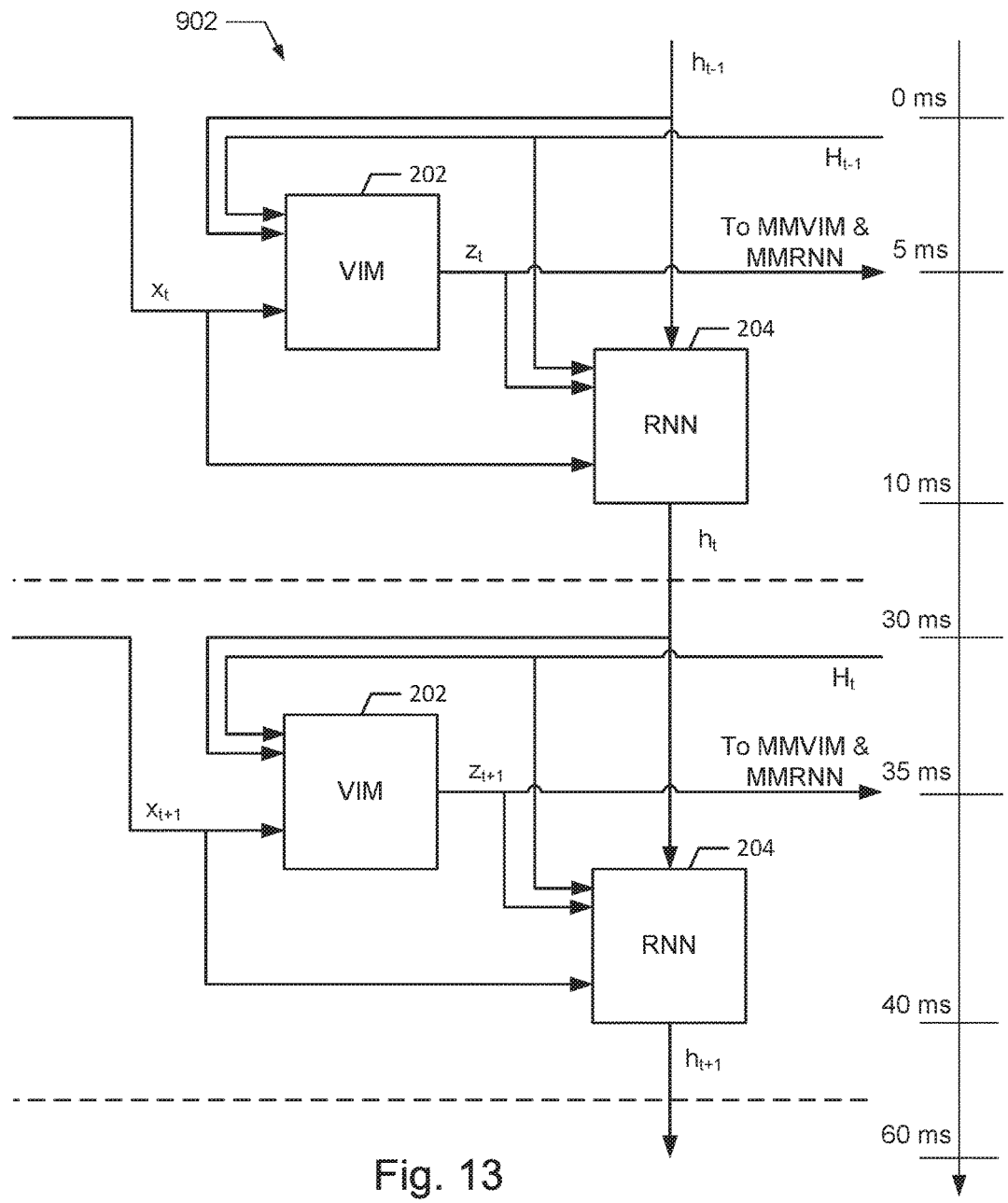
FIG. 13 is a flow diagram illustrating time series data adaptation including sensor fusion, according to an example embodiment of the present disclosure.
Figure 14:
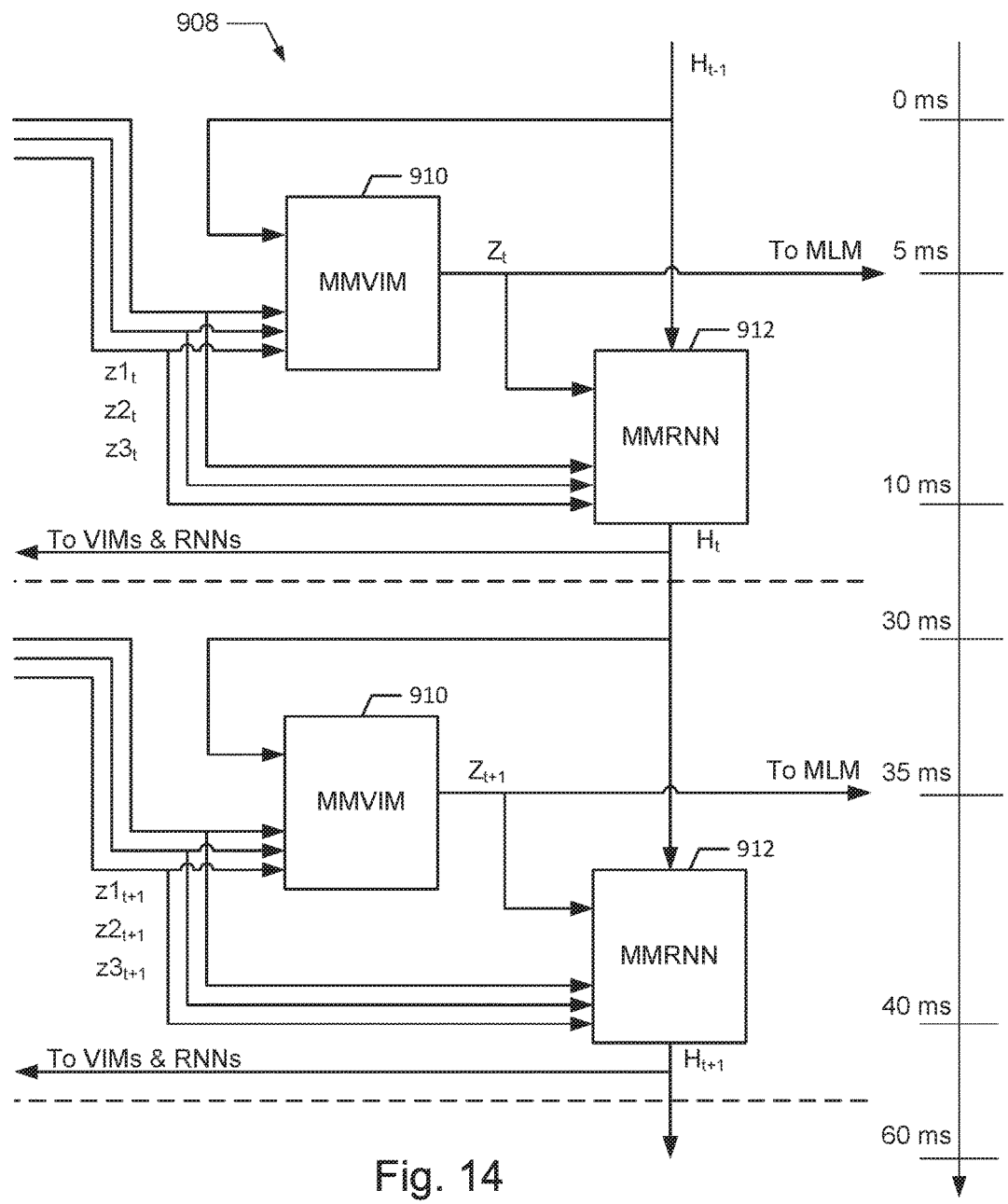
FIG. 14 is a flow diagram illustrating time series data adaptation including sensor fusion, according to an example embodiment of the present disclosure.

FIG. 13 is a flow diagram illustrating time series data adaptation including sensor fusion, according to an example embodiment of the present disclosure. The illustrated VIM-SDFM pair 902 includes a variational inference machine 202 and an RNN 204. As shown in FIG. 13, for example, the time series data $x_t$ and the hidden state $h_{t-1}$ may be received at 0 msec. Also, at the beginning of the time interval, the multi-modal hidden state $H_{t-1}$ may be received from the MMRNN 912, for example, as illustrated in FIG. 14. The time series data $x_t$, the hidden state $h_{t-1}$, and the multi-modal hidden state $H_{t-1}$ are each input in parallel into the input layer of variational inference machine 202, which outputs a latent distribution $z_t$ at 5 msec. The latent distribution $z_t$ is infused with intra-modal time dependency information from the hidden state $h_{t-1}$, as well as inter-modal time dependency information from the multi-modal hidden state $H_{t-1}$. The time dependency infused latent distribution $z_t$ may be provided to the MMVIM 910 and the MMRNN 912, as illustrated in FIG. 14, for example. In an example embodiment, immediately upon being output from the variational inference machine 202, the time dependency infused latent distribution $z_t$ is provided to the MMVIM 910 to allow the multi-modal time dependency infused latent distribution $Z_t$ to be generated as quickly as possible for use in a machine learning model 206 in real time. The RNN 204 receives as inputs, at 5 msec, the time dependency infused latent distribution $z_t$ and the real time data $x_t$. Also, the RNN 204 receives as inputs the multi-modal hidden state $H_{t-1}$ from the MMRNN 912. Then, the RNN 204 updates the hidden state $h_{t-1}$ obtained from the previous time interval to $h_t$. Once the updated hidden state $h_t$ is generated, it may be exported from the RNN 204, for example, at 10 msec. Then the exported hidden state $h_t$ is provided to the variational inference machine 202 as an input at the next time interval (e.g., at 30 msec). The process illustrated in FIG. 13 may be occurring iteratively with the VIM-SDFM pair 902 outputting, at each time interval, a time dependency infused latent distribution (e.g., z1). Also, process illustrated in FIG. 13 may be occurring simultaneously with the other VIM-SDFM pairs 904 and 906, which also output respective time dependency infused latent distributions (e.g., z2 and z3).

FIG. 14 is a flow diagram illustrating time series data adaptation including sensor fusion, according to an example embodiment of the present disclosure. The illustrated sensor fusion machine 908 receives three time dependency infused latent distributions z1, z2, z3, for example from VIM-SDFM pairs 902, 904, and 906 as illustrated with reference to FIG. 13. The time dependency infused latent distributions $z1_t$, $z2_t$, $z3_t$ and a first version of the multi-modal hidden state $H_{t-1}$ may be input in parallel into the input layer of MMVIM 910. For example, the time dependency infused latent distributions $z1_t$, $z2_t$, $z3_t$ may respectively include a 6-tuple, an 8-tuple, and a 12-tuple, and the multi-modal hidden state $H_{t-1}$ may be a 216-tuple. Accordingly, the input layer of the MMVIM 910 may include 242 input nodes. The output layer of the MMVIM 910 outputs a multi-modal time dependency infused latent distribution $Z_t$. The multi-modal time dependency infused latent distribution $Z_t$ may be a 10-tuple (e.g., five sets of latent distributions). The multi-modal time dependency infused latent distribution $Z_t$ may be provided as an input to a machine learning model 206 (e.g., a collision avoidance model).

The input layer of the MMRNN 912 receives the multi-modal time dependency infused latent distribution $Z_t$ and the time dependency infused latent distributions $z1_t$, $z2_t$, $z3_t$, which are input in parallel into the input layer of the MMRNN 912, which may include 36 input nodes. The MMRNN 912 updates the multi-modal hidden state $H_{t-1}$ obtained from the previous time interval to $H_t$, which may include 6 hidden layers, and 216 total nodes. The updated multi-modal hidden state $H_t$ is then exported to the respective input layers of the variational inference machines 202 and the RNNs 204 in each of the VIM-SDFM pairs 902, 904, 906, and the input layer of the MMVIM 910 at the next time interval. Exporting the multi-modal hidden state H to the VIM-SDFM pairs 902, 904, 906 advantageously provides inter-modal time dependencies to the variational inference machines 202 and the RNNs 204 in each of the VIM-SDFM pairs 902, 904, 906. Providing the inter-modal time dependencies of the multi-modal hidden state H to the VIM-SDFM pairs 902, 904, 906 allows for improvement in the accuracy of the time dependency infused latent distributions $z1_t$, $z2_t$, $z3_t$, and hidden states $h1_t$, $h2_t$, $h3_t$, which thereby further improves the accuracy of the multi-modal time dependency infused latent distribution $Z_t$ and the multi-modal hidden state $H_t$.

The process shown in FIG. 14 may iteratively update the multi-modal hidden state H and the multi-modal time dependency infused latent distribution Z, which may be provided to a machine learning model 206 during each time interval. In an example embodiment, one or more feature extractors may be implemented to extract features or condition any of the inputs of the MMRNN 912 and/or the MMVIM 910. It should be appreciated that the time scale provided in FIG. 14 is relative to the time intervals of the sensor fusion machine 908, which may be delayed (e.g., 5 msec) relative to the time scale of FIG. 13.

The structure illustrated in FIGS. 13 and 14 may be particularly advantageous in cases where the time series data x1, x2, x3 are not sparse, since the hidden states h1, h2, h3 of the respective RNNs 204 may each be relatively informative on an individual basis. Further, since the multi-modal hidden state H informs each of the VIM-SDFM pairs 902, 904, 906 of inter-modal time dependencies, the system may be more robust to intermittently unavailable data than if only intra-modal time dependencies were available. However, in an example embodiment, where the time series data x1 is unavailable for a significant period of time, such that time dependency information in hidden state h1 may no longer be accurate, the time dependency infused latent distribution z1 may not be output to the sensor fusion machine 908. As discussed above, the sensor fusion machine 908 may have been trained using stochastic masking to improve robustness to unavailable data (e.g., the unavailable time dependency infused latent distribution z1). In an example embodiment, a VIM-SDFM pair 902 may have a threshold for a specific quantity of time intervals with time series data x1 being unavailable before the output of time dependency infused latent distribution z1 is stopped. The threshold may depend on the stability of the time series data x1. For example, for a stable time series that generally sees relatively small changes between time intervals, a threshold may be set at 10 time intervals. On the other hand, for an erratic time series that often sees a large change within a single time interval, the threshold may be set at one, so if a single time interval value is unavailable, no time dependency infused latent distribution z1 will be output at that time interval. In this case, an erroneous time dependency infused latent distribution z1 may cause far more harm to the resulting multi-modal time dependency infused latent distribution Z than if the sensor fusion machine 908 does not receive the time dependency infused latent distribution z1.

Figure 15:
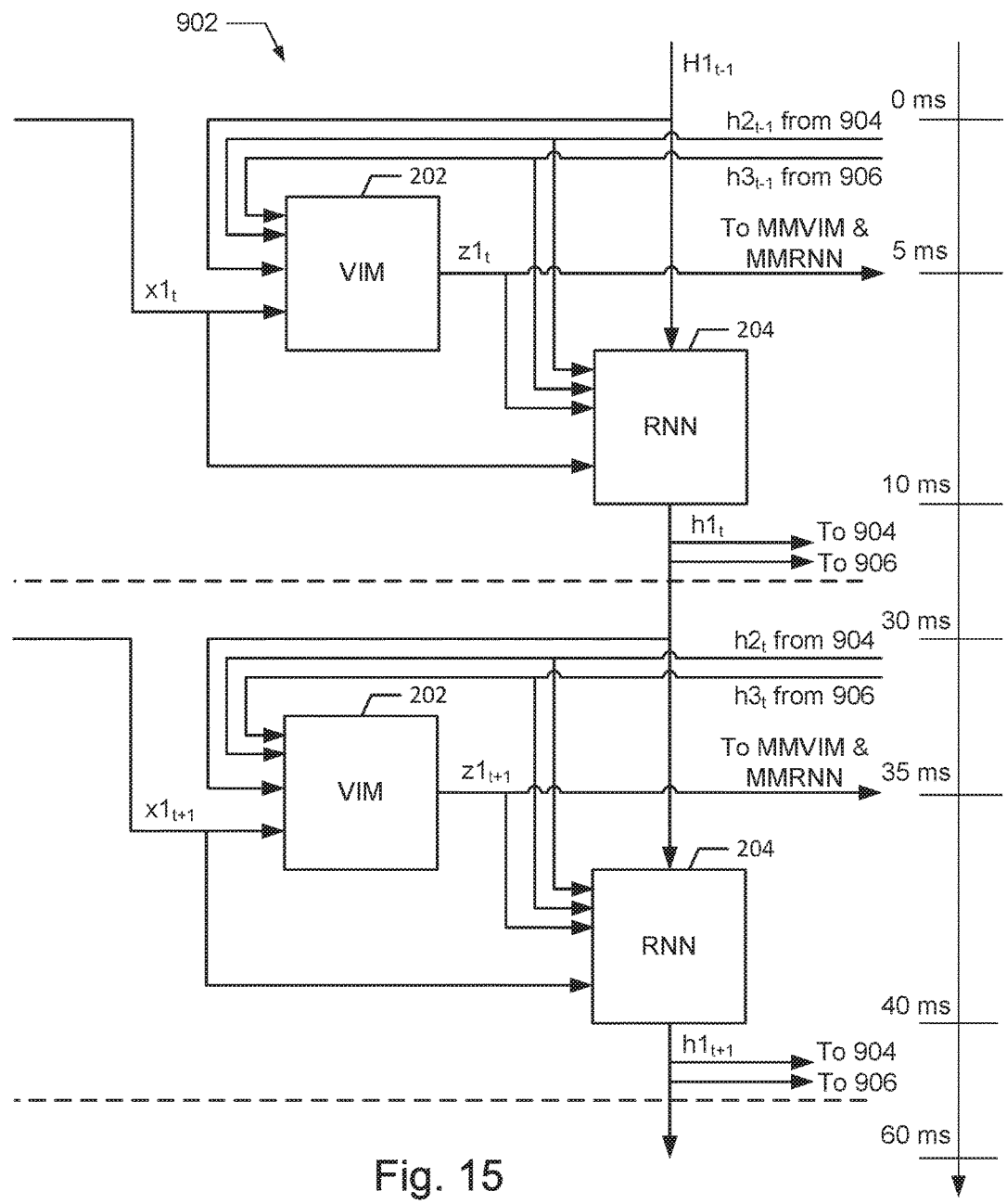
FIG. 15 is a flow diagram illustrating time series data adaptation including sensor fusion, according to an example embodiment of the present disclosure.

FIG. 15 is a flow diagram illustrating time series data adaptation including sensor fusion, according to an example embodiment of the present disclosure. The illustrated VIM-SDFM pair 902 includes a variational inference machine 202 and an RNN 204. As shown in FIG. 15, for example, the time series data $x1_t$ and the hidden state $h1_{t-1}$ may be received at 0 msec. Also, the hidden states $h2_{t-1}$ and $h3_{t-1}$ may be received from the RNNs 204 in the VIM-SDFM pairs 904 and 906 at the beginning of the time interval. Each of the VIM-SDFM pairs 904 and 906 may be structured similarly to the VIM-SDFM pair 902 illustrated in FIG. 15, such that all three VIM-SDFM pairs 902, 904s and 906 are providing their respective hidden states h1, h2, and h3 to each other.

As shown in FIG. 15, the time series data $x1_t$ and the hidden states $h1_{t-1}$, $h2_{t-1}$, and $h3_{t-1}$ are each input in parallel into the input layer of variational inference machine 202, which outputs a latent distribution $z1_t$ at 5 msec. The latent distribution $z1_t$ is infused with intra-modal time dependency information from the hidden state $h1_{t-1}$, as well as inter-modal time dependency information from the hidden states $h2_{t-1}$ and $h3_{t-1}$. The time dependency infused latent distribution $z1_t$ may be provided to the MMVIM 910 and the MMRNN 912, for example, as illustrated in FIG. 10. In an example embodiment, immediately upon being output from the variational inference machine 202, the time dependency infused latent distribution $z1_t$ is provided to the MMVIM 910 to allow the multi-modal time dependency infused latent distribution $Z_t$ to be generated as quickly as possible for use in a machine learning model 206 in real time. The RNN 204 then receives as inputs, at 5 msec, the time dependency infused latent distribution $z1_t$, the time series data $x1_t$, and the hidden states $h2_{t-1}$ and $h3_{t-1}$. Then, the RNN 204 updates the hidden state $h1_{t-1}$ obtained from the previous time interval to $h1_t$. Once the updated hidden state $h1_t$ is generated, it may be exported from the RNN 204, for example, at 10 msec. Then the exported hidden state $h1_t$ is provided to the respective input layers of the variational inference machines 202 and the RNNs 204 in each of the VIM-SDFM pairs 904 and 906, and to the variational inference machine 202 as an input at the next time interval (e.g., at 30 msec). The process illustrated in FIG. 15 may be occurring iteratively with the VIM-SDFM pair 902 outputting, at each time interval, a time dependency infused latent distribution (e.g., z1). Also, process illustrated in FIG. 15 may be occurring simultaneously with the other VIM-SDFM pairs 904 and 906, which also output respective time dependency infused latent distributions (e.g., z2 and z3).

The structure illustrated in FIG. 15 may be particularly advantageous in cases where the time series data x1, x2, x3 are sparse, in which case, each individual type of time series data (e.g., x1) may not be sufficiently informative for each respective hidden state (e.g., h1). Accordingly, incorporating the hidden states (e.g., h2 and h3) of other time series data into the variational inference machine 202 and the RNN 204 may result in an improved hidden state (e.g., h1) and improved time dependency infused latent distribution (e.g., z1) based on inter-modal time dependencies between the different types of time series data. Moreover, this structure may provide a sensor fusion system that is particularly robust to intermittently unavailable data.

Figure 16A:
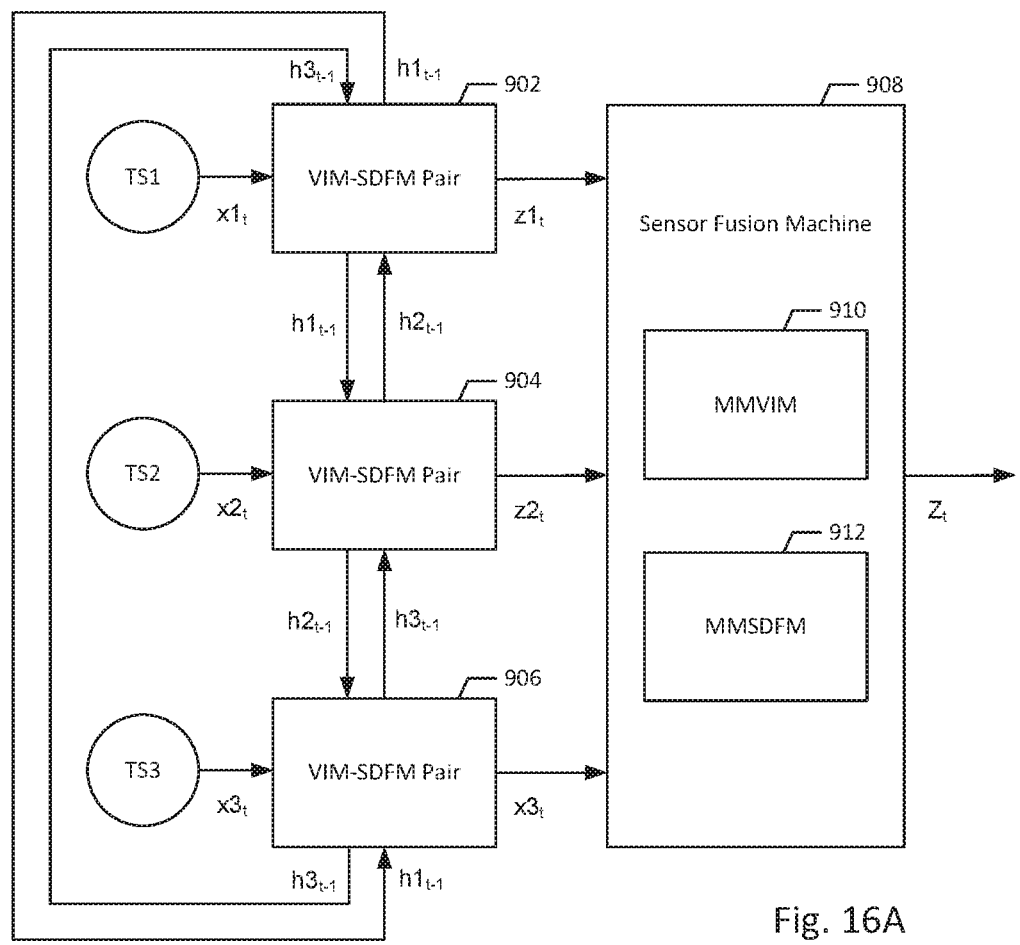
FIGS. 16A to 16D are block diagrams illustrating time series data adaptation including sensor fusion with unavailable data, according to an example embodiment of the present disclosure.

FIGS. 16A to 16D are block diagrams illustrating time series data adaptation including sensor fusion with unavailable data, according to an example embodiment of the present disclosure. As shown in FIG. 16A, a system as described above with reference to FIG. 15 is illustrated. For example, three types of sensors provide three types of time series (e.g., TS1 is lidar, TS2 is radar, and TS3 is ultrasound). As shown in FIG. 16A, TS1 is outputting $x1_t$, which is received by VIM-SDFM pair 902, which exports its hidden state $h1_{t-1}$ to both of VIM-SDFM pair 904 and 906, receives hidden states $h2_{t-1}$ and $h3_{t-1}$, and outputs the time dependency infused latent distribution $z1_t$.

Figure 16B:
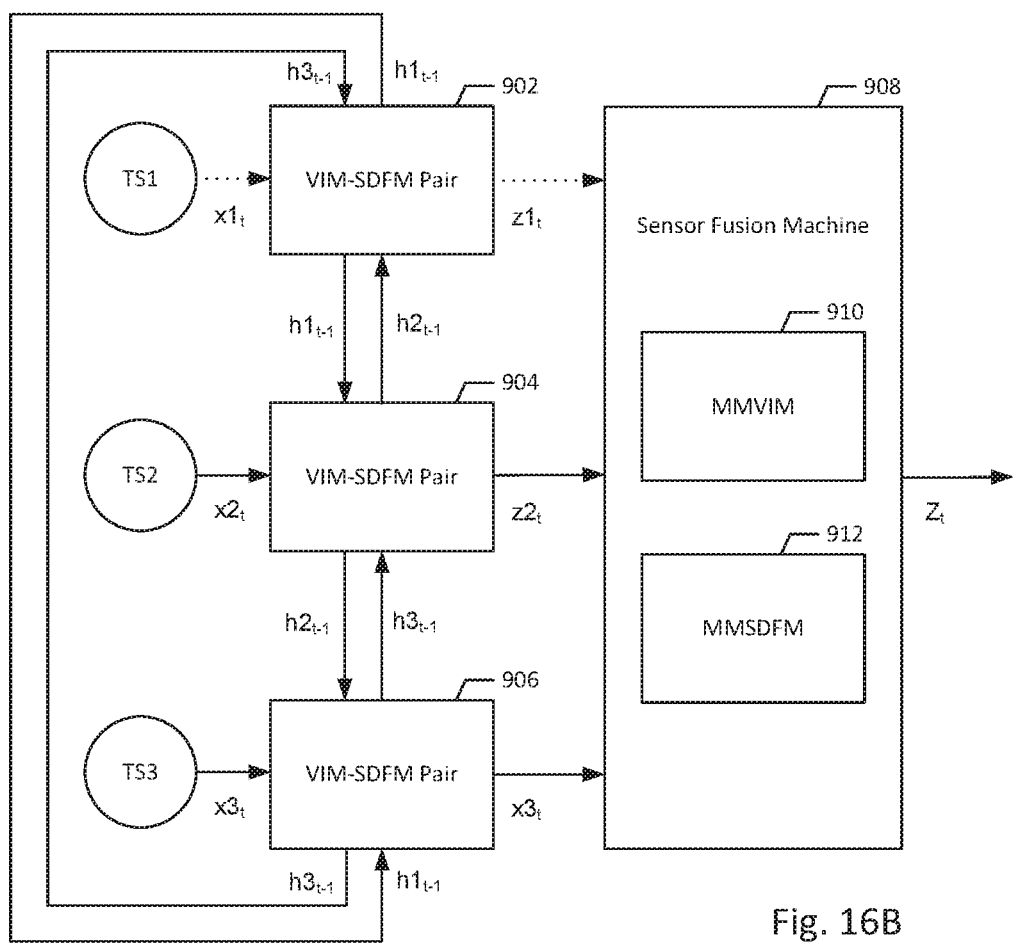

As shown in FIG. 16B, the time series data $x1_t$ is missing or unavailable, as indicated by the dotted line. In this example embodiment, the time dependency infused latent distribution $z1_t$ is not output from the VIM-SDFM pair 902 to the sensor fusion machine 908, however, the hidden state $h1_{t-1}$ is still exported to the other VIM-SDFM pairs 904 and 906, which respectively still export their hidden states $h2_{t-1}$ and $h3_{t-1}$ to the VIM-SDFM pair 902. Accordingly, the hidden state h1 may be maintained using both intra-modal time dependencies and inter-modal time dependencies. The hidden state h1 may remain robust to intermittently missing sensor data for longer periods of time because inter-modal time dependencies from hidden states h2 and h3 may provide information regarding an underlying phenomenon or correlation between the different types of time series data. Also, the other hidden states h2 and h3 may continue to use the inter-modal time dependencies from the hidden state h1. In this example embodiment, the sensor fusion machine 908 was trained using stochastic masking to be robust to unavailable time dependency infused latent distributions (e.g., $z1_t$). The system may advantageously not output the time dependency infused latent distribution $z1_t$ while still exporting the hidden state $h1_{t-1}$, which will provide optimal results when the time series data x1 is missing only for a short time (e.g., 5 time intervals). How long or short of a period of time will provide good results will depend on the stability of the type of time series. For example, in Table 1 above, some sensors may collect data at different intervals (e.g., 10 msec, 20 msec, 30 msec). Thus, it may be routine for one or more of VIM-SDFM pairs 902, 904, 906 to have unavailable data for one, two, or more time intervals, as illustrated above in Table 1. Similarly, some sensors may be temporarily unavailable due to environmental conditions. For example, a lidar sensor may be sensing an area in direct sunlight, which may render the data unavailable. There are various reasons why sensors may provide intermittent data. For example, an edge device 100 may lose power (e.g., unplugged and/or batteries die), may be moved to an area with limited or no connectivity due to interference (e.g., mountains, rain), or may be turned off by a user. Also, a particular data collection device 104 may become non-functional for a variety of reasons, such as being broken.

Figure 16C:
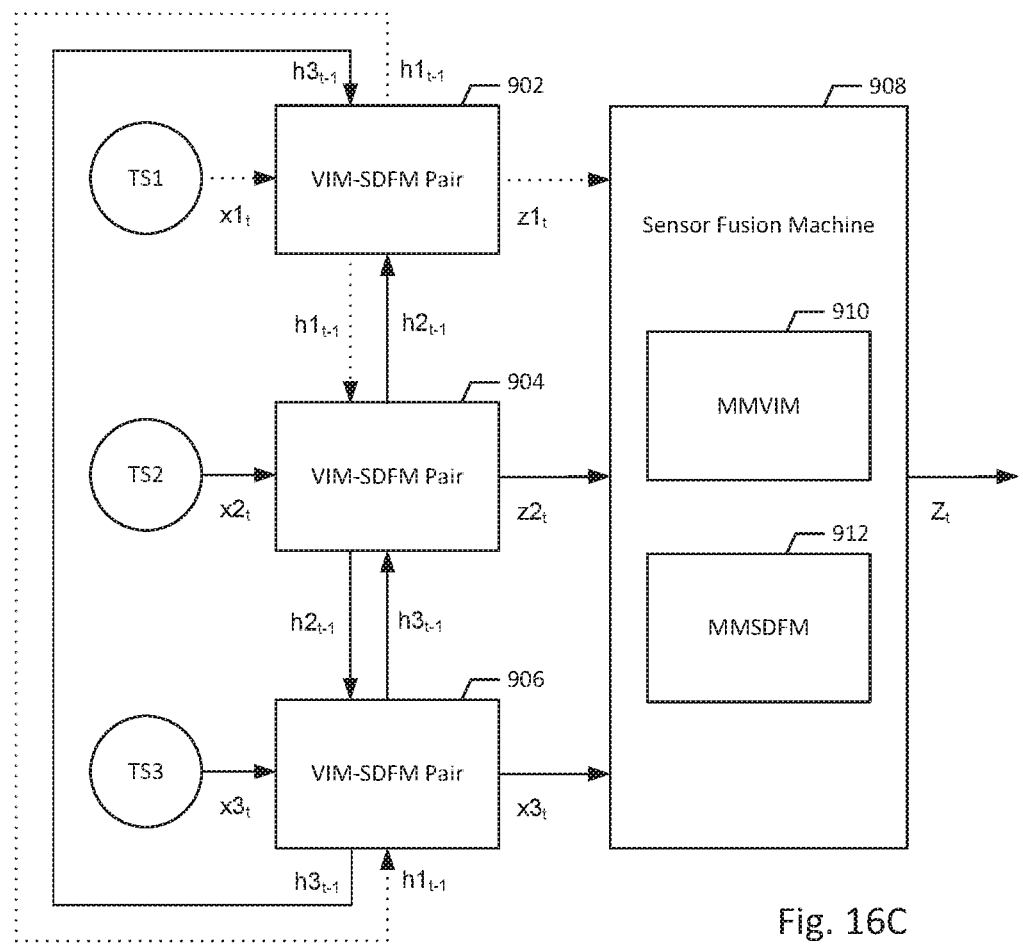

As shown in FIG. 16C, the time series data $x1_t$ and the time dependency infused latent distribution $z1_t$ are unavailable. Also, in FIG. 16C, the hidden state $h1_{t-1}$ is not exported from the VIM-SDFM pair 902 to the VIM-SDFM pairs 904 and 906. For example, a threshold period of time has elapsed since TS1 has provided the time series data x1. Once the VIM-SDFM pair 902 determines that a threshold amount of time or threshold quantity of time intervals has elapsed, the hidden state $h1_{t-1}$ may not be sufficiently accurate and is no longer exported to the VIM-SDFM pairs 904 and 906. The hidden states $h2_{t-1}$ and $h3_{t-1}$ may still be received at the VIM-SDFM pair 902 to help maintain the hidden state $h1_{t-1}$ to the extent possible until the time series data x1 is received at some point in the future. For example, if the time series data x1 becomes available just a few time intervals after it stopped exporting the hidden state $h1_{t-1}$, the hidden state h1 would likely still be relatively accurate, partially due to continuing to receive the hidden states $h2_{t-1}$ and $h3_{t-1}$. However, at some point in time, it may no longer be useful to provide the hidden states $h2_{t-1}$ and $h3_{t-1}$ to the VIM-SDFM pair 902, as shown in FIG. 16D.

Figure 16D:
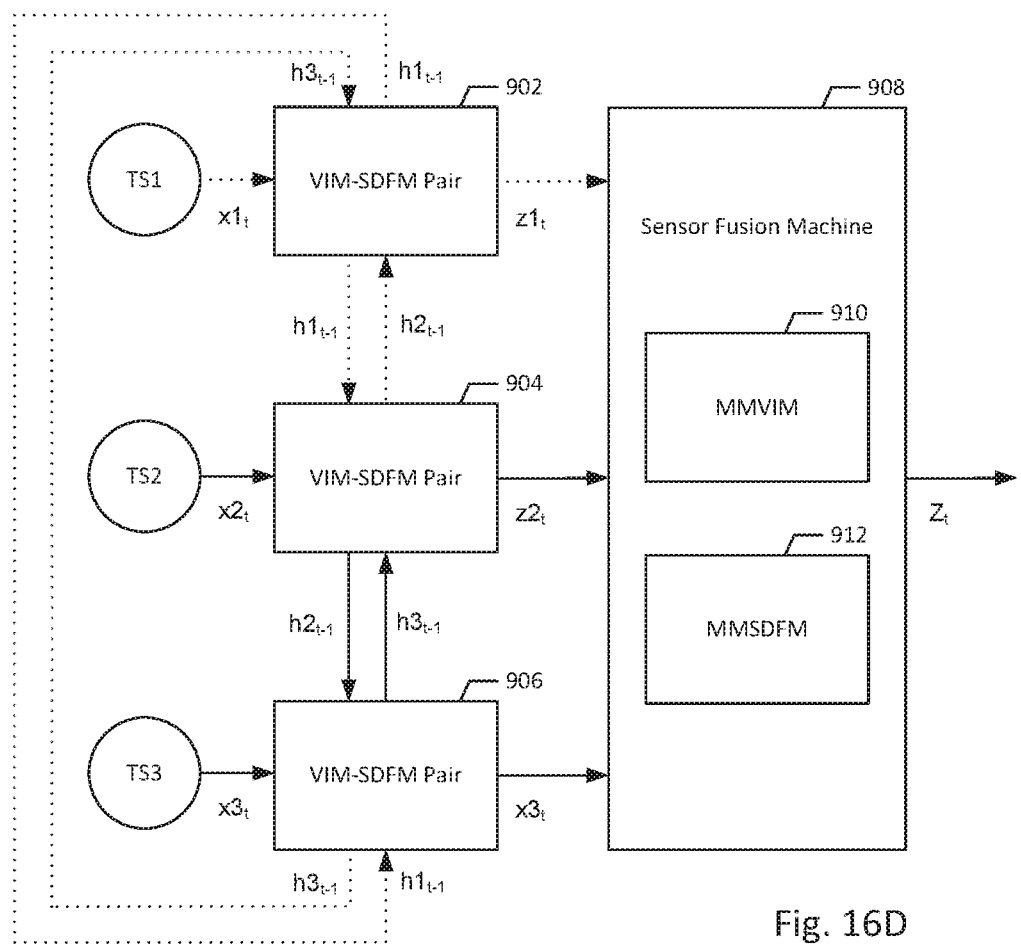

As shown in FIG. 16D, the VIM-SDFM pair 902 does not receive $x1_t$, does not output the time dependency infused latent distribution $z1_t$, does not export the hidden state $h1_{t-1}$, and does not receive the hidden states $h2_{t-1}$ and $h3_{t-1}$. In an example embodiment, a second threshold may be used to determine that the VIM-SDFM pair 902 does not need to be provided with the other hidden states $h2_{t-1}$ and $h3_{t-1}$, as shown in FIG. 16D. For example, the VIM-SDFM pairs 904 and 906 may determine that the hidden state $h1_{t-1}$ has not been received for a period of time or a quantity of time intervals (e.g., 5, 20, 50, 100), and accordingly stop exporting the hidden states $h2_{t-1}$ and $h3_{t-1}$, respectively, to the VIM-SDFM pair 902. Thus, FIG. 16D may illustrate a system with a sensor that has been turned off, is broken, has lost connectivity (e.g., network connection failed), or is experiencing some environmental interference for a significant period of time. Also, in some cases, a particular type of sensor may be too expensive for a system to utilize. For example, a machine learning model 206 for collision avoidance may be trained to use a multi-modal time dependency infused latent distribution as input, where lidar is a modality of data that is used. However, given the relatively expensive cost of lidar, this sensor may be cost prohibitive in low end vehicles. Thus, in such a vehicle, the system may function as illustrated in FIG. 16D. Advantageously, the sensor fusion machine 908 may be the same in vehicles with or without the lidar sensor. Likewise, the machine learning model 206 (e.g., collision avoidance) that receives the multi-modal time dependency infused latent distribution $Z_t$, may be the same in vehicles with or without the lidar sensor. Thus, the presently disclosed system advantageously allows for sensor adaptability, allowing for intermittently unavailable data and/or permanently unavailable data.

Figure 17:
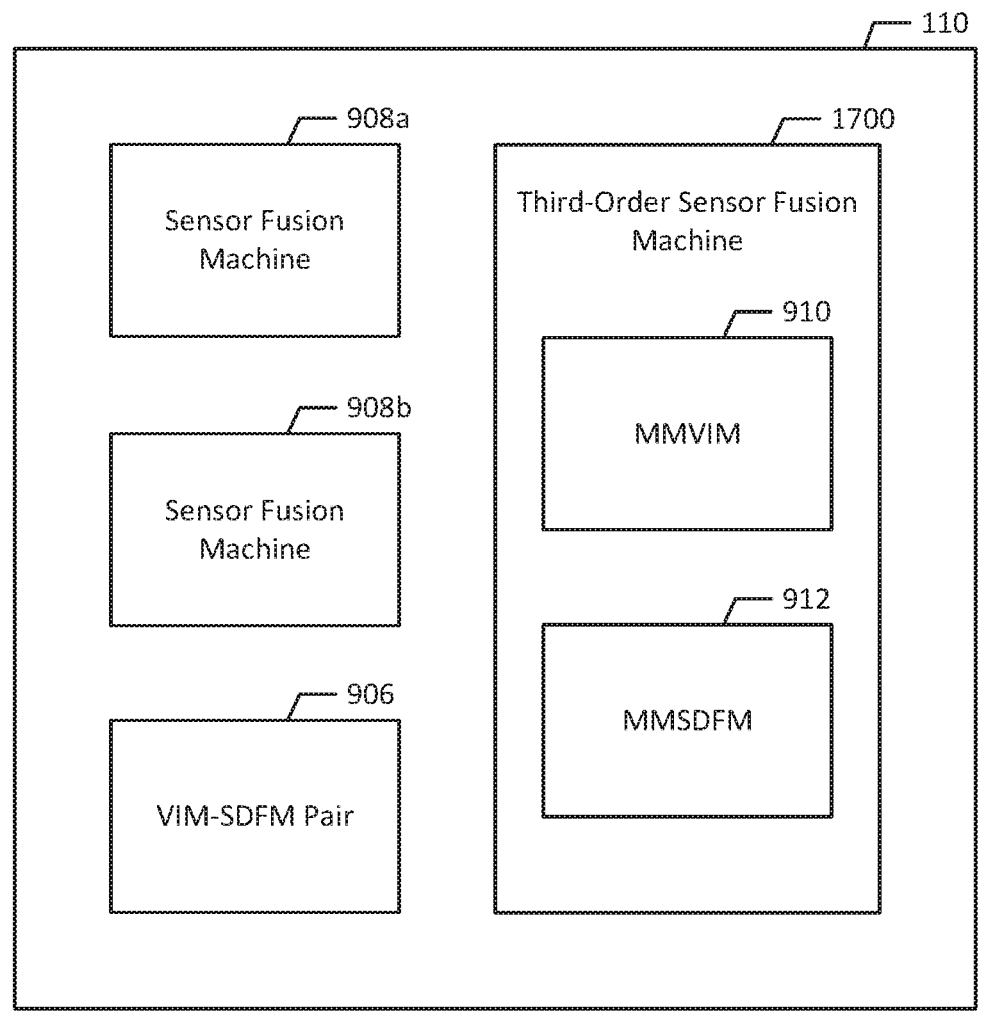
FIG. 17 is high-level block diagram of a time series data adaptation module, according to an example embodiment of the present disclosure.

FIG. 17 is high-level block diagram of a time series data adaptation module, according to an example embodiment of the present disclosure. In an example embodiment, the output of the sensor fusion machine 908 (e.g., FIGS. 10, 11, 14, 16) may be provided as an input into a higher-order sensor fusion machine in the time series data adaptation module 110 for further sensor fusion, such as a third-order sensor fusion machine 1700. For example, the third-order sensor fusion machine 1700 may receive a first multi-modal time dependency infused latent distribution $Z1_t$ and a second multi-modal time dependency infused latent distribution $Z2_t$ as inputs, similarly to the sensor fusion machine 908 receiving inputs of multiple time dependency infused latent distributions z1, z2, z3. Also, in an example embodiment, the third-order sensor fusion machine may perform mixed adaptions, such as fusing a multi-modal time dependency infused latent distribution Z from sensor fusion machine 908a with a single-modal time dependency infused latent distribution z from VIM-SDFM pair 906.

Moreover, the present system may advantageously use edge devices 100 that are part of the Internet of Things (IoT), which is rapidly growing and already includes billions of devices that collect a vast array of different types of data. As the IoT continues to evolve, more and more types of time series data will be available from more and more edge devices 100 in many different domains. This evolution of the IoT causes a problem of data type overload, where an overabundance of useful types of sensor data are typically available, which is advantageously addressed by the presently disclosed method of sensor fusion. For example, any of a variety of different types of video cameras (e.g., thermal video, infrared video, ultraviolet video, night vision video, security camera, webcam) may provide rich time series data that is fused with time series data from sensors that sense non-image time series data. Further, although the above example embodiments generally include three data types being fused together via sensor fusion, any number of different data types (e.g., 2, 10, 30, 100, 300, 500) may be fused in the same manner as described above to create a time dependency infused latent distribution Z.

It should be appreciated that the above discussed examples are merely exemplary, and adaptation of time series data may relate to any type of data, and the associated machine learning models 206 may relate to any suitable predefined task. A data collection device 104 may sense or detect any real world time series data from the surrounding environment to provide the time series data if it provides information relevant to any predefined task. In an example embodiment, a machine learning model 206 may be directed to determining a target cornering speed for a vehicle. For example, a vehicle may include self-driving features, such as automatic braking based on a predicted collision, and alerts or alarms for the driver. In an example embodiment, a vehicle may be an edge device 100 that includes data collection devices 104 such as a video camera for analyzing upcoming corners (e.g., curves or turns in the road). The data collection devices 104 may provide a data stream of time series data that is used to determine a sharpness of a bend, a slope of the road, and a camber of the road, a current speed or velocity, a slip angle, a tire-pavement friction, a weight of automobile, a distribution of weight, a moisture level, a temperature, etc. The machine learning model 206 may output a target speed for each upcoming corner, which may be used by the automobile for applying the brakes, alerting the user of a dangerous condition, or the like. The collected video data may undergo one or more data adaptation processes, including second-order multi-modal sensor fusion, as discussed above. This example machine learning model 206 for target cornering speed may involve significant overlap with the above discussed collision avoidance machine learning model 206. In such cases, the very same raw time series data may be used in multiple different sensor fusions for different machine learning models 206.

The above discussed machine learning models 206 relating to tasks such as collision avoidance and determining a target cornering speed may involve a wide array of different types of data being collected. Much of this data may also be relevant to other predefined tasks such as vehicle maintenance. In an example embodiment, third-order sensor fusion is used to generate a third-order multi-modal time dependency infused latent distribution for a vehicle driving control machine learning model 206. For example, three second-order sensor fusion machines 908 may be used as input to a third-order sensor fusion machine.

Figure 18:
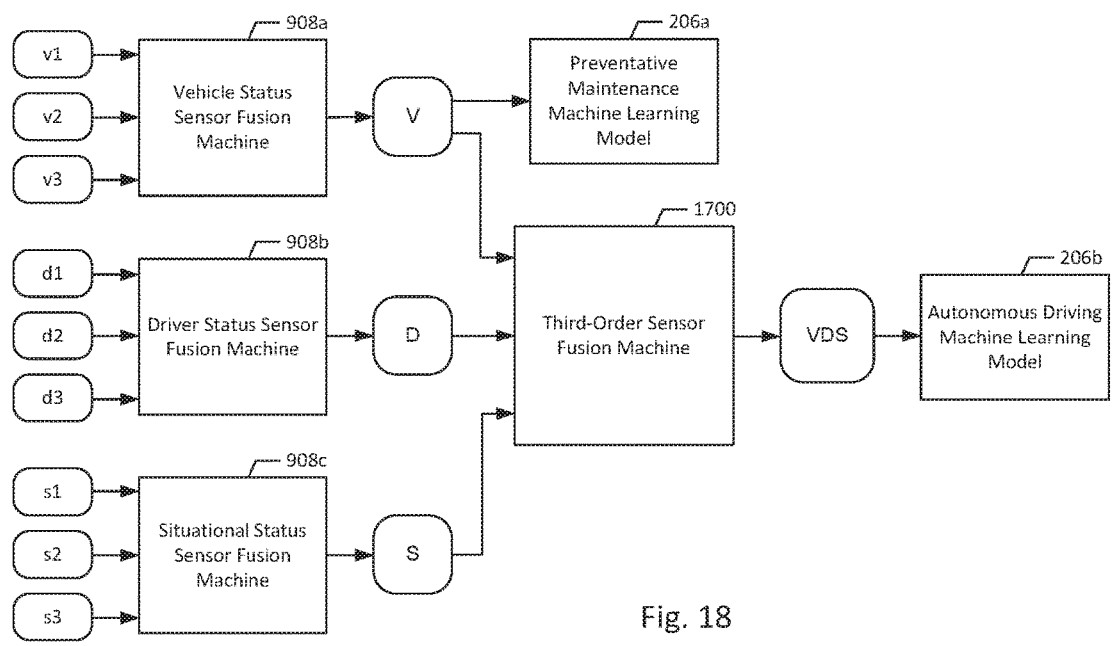
FIG. 18 is a flow diagram illustrating time series data adaptation including third-order sensor fusion, according to an example embodiment of the present disclosure.

FIG. 18 is a flow diagram illustrating time series data adaptation including third-order sensor fusion, according to an example embodiment of the present disclosure. For example, a system included in a vehicle may include three second-order sensor fusion machines 908. As shown in FIG. 18, the system includes a vehicle status sensor fusion machine 908a, a driver status sensor fusion machine 908b, and a situational status sensor fusion machine 908c. The inputs to the vehicle status sensor fusion machine 908a may include single-modal time dependency infused latent distributions v1, v2, v3, which may be based on time series data from a variety of sensors that monitor the status of the vehicle operation (e.g., speed, engine temperature, time pressure, oil viscosity). The inputs to the driver status sensor fusion machine 908b may include single-modal time dependency infused latent distributions d1, d2, d3, which may be based on time series data from a variety of sensors that monitor the status of the driver of the vehicle (e.g., attention level, drowsiness, eye direction). The inputs to the situational status sensor fusion machine 908c may include single-modal time dependency infused latent distributions s1, s2, s3, which may be based on time series data from a variety of sensors that monitor the status of the situation of the vehicle or the surroundings of the vehicle (e.g., detection of other vehicles, pedestrians, lane lines, traffic lights, rain, snow, fog, road ice). It should be appreciated that although only three types of data (e.g., v1, v2, v3) are illustrated as being input into each of the sensor fusion machines 908a, 908b, 908c, many more types of data may typically be used as inputs.

The vehicle status sensor fusion machine 908a outputs a multi-modal time dependency infused latent distribution V, which is input directly into a preventative maintenance machine learning model 206a. Also, the multi-modal time dependency infused latent distribution V is input directly into the third-order sensor fusion machine 1700. Additionally, the third-order sensor fusion machine 1700 receives a multi-modal time dependency infused latent distribution D that is output from the driver status sensor fusion machine 908b and a multi-modal time dependency infused latent distribution S that is output from the driver status sensor fusion machine 908c. The third-order sensor fusion machine 1700 may operate in a similar manner as discussed above in relation to FIGS. 10, 14, 15, and/or 16. The third-order sensor fusion machine 1700 may then output a multi-modal time dependency infused latent distribution VDS, which is input into an autonomous driving machine learning model 206b. Hierarchical sensor fusion, for example as shown in FIG. 18, may include any number and/or type of information as inputs (e.g., raw time series data, distributed representations, latent variables, latent distributions, and multi-modal data).

Figure 19:
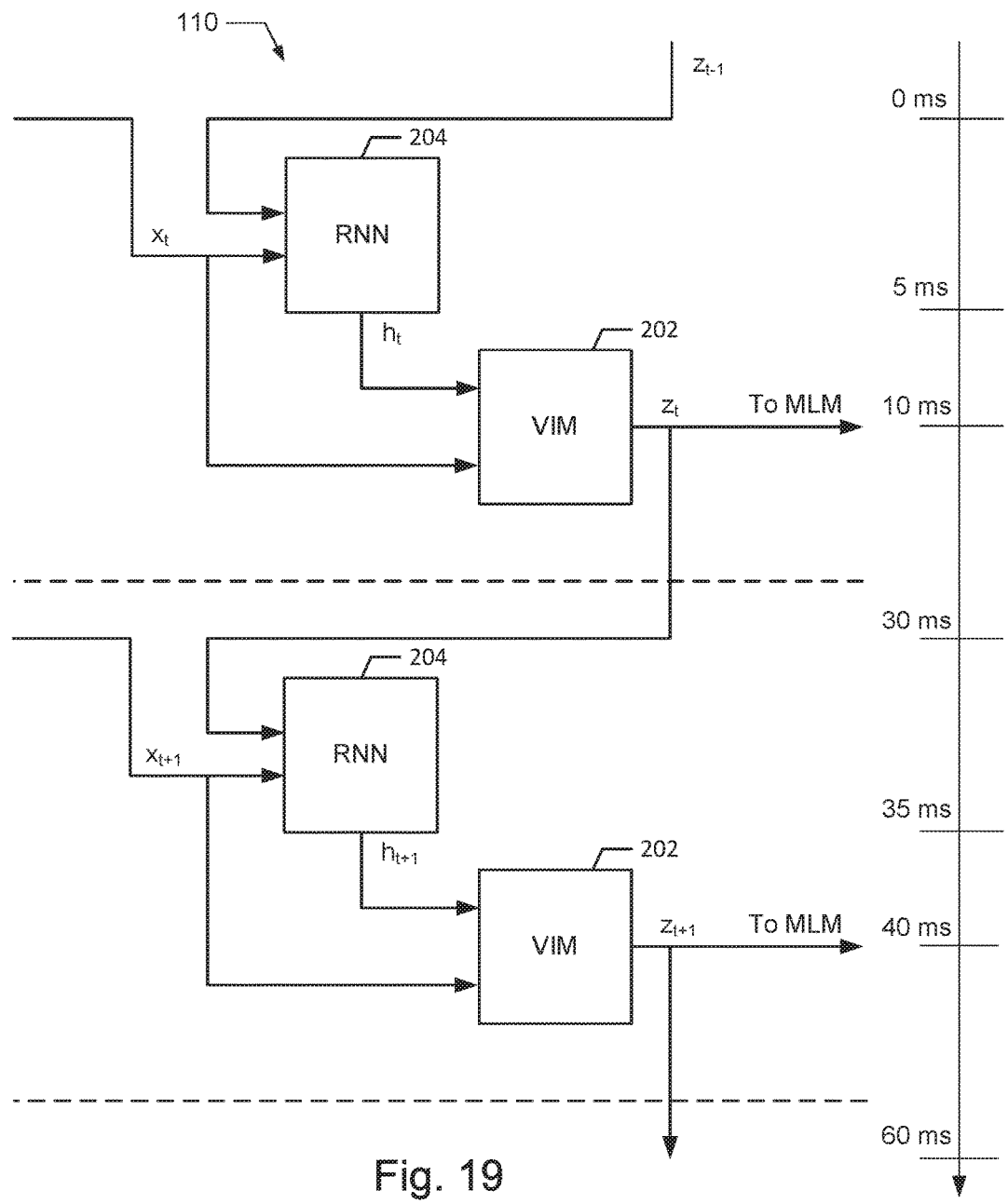
FIG. 19 is a flow diagram illustrating time series data adaptation, according to an example embodiment of the present disclosure.

FIG. 19 is a flow diagram illustrating time series data adaptation, according to an example embodiment of the present disclosure. The above discussed examples generally refer to the time series data adaptation module 110 performing time series data adaptation by a variational inference machine outputting a time dependency infused latent distribution for a current time interval to a sequential data forecast machine, which operates on the data of the current time interval after the variational inference machine. However, this structure is merely exemplary. For example, FIG. 19 illustrates an alternative example embodiment, where the system is structured such that an RNN 204 operates on current time interval data (e.g., $x_t$) prior to a variational inference machine 202. The RNN 204 may receive a time dependency infused latent distribution $z_{t-1}$ from the previous time interval and time series data $x_t$ to update the hidden state $h_t$. Then, the updated hidden state $h_t$ may be exported to the variational inference machine 202, which receives as inputs the hidden state $h_t$ and the time series data $x_t$. Then, the variational inference machine 202 may output the time dependency infused latent distribution $z_t$, which may be sent to a machine learning model 206. This process may be iteratively performed in similar fashion as discussed above. The structure shown in FIG. 19 may be used for single-modal or multi-modal time series data adaptation using any of the above descried techniques.

Certain types of mechanical and/or industrial equipment may require monitoring to ensure that the equipment is operating properly and receiving maintenance as needed to avoid or delay failures that may incur costly downtime and/or repairs. It should be appreciated that in a manufacturing facility, failure of a key piece of equipment can cause huge financial losses and/or create a safety risk to employees. Accelerometers that detect vibration in rotating components can provide early detection of potential problems with the equipment and enable the facility operator to take preventative action of repairing or shutting down the piece of equipment before failure occurs. Vibration time series data is generally collected from accelerometers that are permanently mounted near rotating components. Frequently, a single rotating component may be monitored by multiple accelerometers. For example, a common technique involves monitoring a rotating component with three accelerometers, one each to measure vibration along the vertical (X), tangential (Y), and radial (Z) axes. Depending on its complexity and size, a single piece of machinery may have hundreds or thousands of monitored rotating components.

Vibration time series data can indicate problematic trends or anomalies, which may be detected by machine learning models. For example, machine learning analysis of gear mesh frequency in power transmission units may detect small sand or dirt particles lodged between the teeth of gears, which introduces metal particles into the gearbox. In an example embodiment, vibration time series data is used for identification of imbalance conditions in rotating equipment such as fans and/or for detection of defects in the bearings of rotating equipment. Also, for example, frequency analysis may be used to determine if rotating equipment is rotating at frequencies that approach the natural frequencies of the supporting structure. Models for a large variety of tasks have already been trained on vibration time series data, so vibration time series data is generally very useful for predictive maintenance. However, collection of vibration time series data requires a large number of permanently mounted accelerometers, which may not be practicable depending on the machinery and factory setting. Accordingly, the presently disclosed sensor fusion methods, which may be robust to permanently unavailable data and intermittently unavailable data, may advantageously be used in machine maintenance predictive systems. Moreover, fusing data types as described in the above sensor fusion methods may allow for improved extraction of information from available data, which may result in improved predictive maintenance, less equipment downtime, lower repair costs, improved safety, and the like for a wide variety of equipment, including vehicles, steam traps, and manufacturing equipment.

Some previously existing machine learning methods (e.g., for industrial predictive maintenance) were generally useful for handling some specific types of time series data, for example, in a homogeneous environment or within a specific edge device 100. However, we recognize that the variability of available data types and sources that may be collected for analysis, particularly in heterogeneous environments such as the IoT, cannot be adequately handled using the existing methods. For example, it is not practicable to train accurate machine learning models for each specific type of data and/or for each specific source of data. Attempting to address this problem with better and faster computer and/or networking hardware proves inadequate, as even the most technologically advanced computer hardware, software, and networking capabilities are not suitable for handling the ever expanding data domains or modalities, types of data, and specific data sources of heterogeneous environments which are typically encountered. In other words, the existing techniques are generally insufficient for handling machine learning in a heterogeneous environment with a wide variety of different data types and sources that provide time series data, particularly when intermittent unavailability of data may occur and/or when a desired data type is permanently unavailable. On the other hand, collection and processing of time series data for machine learning or the like as proposed herein takes a different technological approach that was not possible using previously existing methods and systems. Accordingly, machine learning devices, particularly when using edge devices 100 in heterogeneous environments such as the IoT, are improved by using the methods and systems as described herein. For example, the technology of collision avoidance, autonomous driving, COPD risk assessment, and predictive maintenance in relation to vehicles, manufacturing equipment, steam traps, or various other equipment may be greatly improved by time series data adaptation of the present disclosure, particularly when sensor data may be unexpectedly or intermittently unavailable.

Further, the presently disclosed sensor fusion methods and systems may advantageously enable a wide variety of systems to use whatever sensor data may be available, at any given point in time, to its fullest potential through the synergy of the sensor fusion. A sensor fusion machine provides a great deal of synergy in the expressive power of the raw time series data input into the sensor fusion machine because the fused sensor data integrates a range of sensory information that provides a much stronger understanding of the situation or the phenomena being observed. Accordingly, sensor fusion as presently disclosed is particularly robust to intermittently and/or permanently unavailable data and also to outliers in data. Moreover, once a sensor fusion machine is trained and a corresponding machine learning model is trained based on the sensor fusion data (e.g., multi-modal time dependency infused latent distribution Z), the sensor fusion machine and machine learning model may be widely useable (e.g., in many makes or models of vehicles with differing collision avoidance sensors) based on the ability to adapt to many different sensor configurations with one or more different types of time series data unavailable (e.g., no lidar, no video, or radar, and/or no ultrasound).

Also, when a machine learning model, which is trained to output a time dependency infused latent distribution based on a large variety of time series modalities, is deployed in a situation where one or more modalities is unavailable, the machine learning model will typically be more accurate than if it had only been trained on the modalities available during deployment. During training, underlying associations and relationships are formed through the integration of all of the modalities, including the presently unavailable modalities, which would not have been learned without training with the presently unavailable modalities. Thus, for example, even if a majority of vehicles will not include an expensive lidar sensor, training a sensor fusion machine and a machine learning model to use lidar time series data should typically benefit vehicles that do not have a lidar sensor. Information that would be unknowable or intractable from analysis of the different individual types of time series data from different sensors may advantageously be created through the synergy of sensor fusion.

Similarly, it may be expected that, for a COPD risk assessment machine learning model, arterial blood gas (ABG) analysis data will likely be unavailable as an input. Generally, ABG measures a patient's lung function by measuring oxygen metabolism, blood pH levels, and blood levels of oxygen. Although ABG is currently the best method of evaluating the acuteness and severity of disease exacerbation, it is not practical for ongoing monitoring, as it is an uncomfortable and expensive procedure that is performed in a health care facility. Thus, the training data for the COPD risk assessment machine learning model includes time series data collected from in-hospital tests and from non-hospital home monitoring devices (e.g., respiration rate, pulse oximeter, home spirometer, peak flow meter) and environmental monitoring devices (e.g., dust level, smoke level, air pollution). Accordingly, the COPD risk assessment machine learning model is trained on a comprehensive set of time series data, to provide better results for regular home health monitoring based on the reality that ABG in-hospital time series data will typically be unavailable.

Moreover, the presently disclosed sensor fusion machine creates synergy through use of the intra-modal and inter-modal time dependencies as described above, thereby providing more accurate results in advantageously adaptable and fault tolerant systems. Thus, even when data being input into a time series data adaptation module and/or a sensor fusion machine is unavailable, a useable result may still be provided by a machine learning model based on the output of the time series data adaptation module and/or the sensor fusion machine.

It will be appreciated that all of the disclosed methods and procedures described herein can be implemented using one or more computer programs, modules, or components. These modules or components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures. As used in the following claims, the terms "means" and/or "step" may be used to invoke means plus function treatment under 35 U.S.C. 112(f), and means plus function treatment is not intended to be invoked unless the terms "means" or "step" are recited in the claims.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A computer-implemented system comprising:
a variational inference machine including a neural network that includes a first input layer, a first plurality of hidden layers, and a first output layer;
a sequential data forecast machine including a neural network that includes a second input layer and a second plurality of hidden layers, the second plurality of hidden layers including a hidden state; and
a machine learning model including a neural network, wherein the variational inference machine, the sequential data forecast machine, and the machine learning model are configured to iteratively perform:
exporting, from the second plurality of hidden layers, a first version of the hidden state, which includes time dependency information,
receiving, at the first input layer, (i) time series data of a first time interval from at least a first sensor and (ii) the first version of the hidden state,
outputting, by the first output layer, a time dependency infused latent distribution that is generated based on the time series data of the first time interval and the first version of the hidden state,
obtaining, by the second plurality of hidden layers, the first version of the hidden state,
receiving, at the second input layer, (i) the time series data of the first time interval and (ii) the time dependency infused latent distribution from the variational inference machine,
updating the hidden state in the second plurality of hidden layers based on the time series data of the first time interval, the time dependency infused latent distribution, and the first version of the hidden state to generate a second version of the hidden state,
inputting the time dependency infused latent distribution into the machine learning model, and
outputting, from the machine learning model, a result of the first time interval based on the time dependency infused latent distribution.

2. The computer-implemented system of claim 1, wherein the result causes an instruction to be sent to an actuator to perform an actuation.

3. The computer-implemented system of claim 2, wherein the actuation is at least one of steering or braking.

4. The computer-implemented system of claim 1, wherein the time series data, which is output from a first sensor, is unavailable at the first time interval.

5. The computer-implemented system of claim 4, wherein the result is fault tolerant to intermittent unavailability of the first sensor at the first time interval.

6. The computer-implemented system of claim 1, wherein the time series data is multi-dimensional data from one of an image sensor, a lidar sensor, or a radar sensor.

7. The computer-implemented system of claim 1, wherein the time series data includes a first time series of a first modality and a second time series of a second modality, and the time dependency infused latent distribution is a multi-modal time dependency infused latent distribution.

8. The computer-implemented system of claim 1, further comprising a first sensor and a second sensor, wherein the first sensor senses a first type of data of a first modality, and the second sensor senses a second type of data of a second modality.

9. The computer-implemented system of claim 8, wherein the first modality is radar and the second modality is ultrasound.

10. The computer-implemented system of claim 8, further comprising a third sensor, which senses a third type of data of a third modality.

11. The computer-implemented system of claim 10, wherein the first modality is radar, the second modality is ultrasound, and the third modality is lidar.

12. The computer-implemented system of claim 1, wherein the first input layer and the second input layer receive a first version of a second hidden state from a second sequential data forecast machine.

13. The computer-implemented system of claim 12, wherein time dependency infused latent distribution is generated based on the first version of the second hidden state from the second sequential data forecast machine.

14. The computer-implemented system of claim 13, wherein the second sequential data forecast machine is a multi-modal sequential data forecast machine.

15. The computer-implemented claim 1, wherein the first input layer includes a first sublayer and a second sublayer, wherein the time series data is input into the first sublayer, and the hidden state is input into the second sublayer.

16. The computer-implemented system of claim 1, wherein the sequential data forecast machine includes a recurrent neural network.

17. The computer-implemented system of claim 16, wherein the recurrent neural network includes a second output layer that outputs a prediction of future time series data.

18. The computer-implemented system of claim 1, further comprising a variational generation machine that generates an output representative of the time series data received by the first input layer.

19. The computer-implemented system of claim 1, wherein the computer-implemented system is implemented in an edge device.

20. The computer-implemented system of claim 1, wherein the computer-implemented system is implemented in a vehicle.

21. The computer-implemented system of claim 1, wherein a new version of the hidden state is generated in a different time interval at least once every 30 milliseconds.

22. The computer-implemented system of claim 21, wherein the machine learning model executes at least once every 30 milliseconds using a new version of the time dependency infused latent distribution.

23. The computer-implemented system of claim 1, wherein the time series data includes image data.

24. The computer-implemented system of claim 1, wherein the time series data includes sound data.

25. The computer-implemented system of claim 1, wherein the time series data includes acceleration data.

26. The computer-implemented system of claim 1. wherein the time series data is binary data.

27. The computer-implemented system of claim 1, wherein the result is at least one of a forecast, a prediction, a classification, a clustering, an anomaly detection, or a recognition.

28. A computer-implemented method comprising:
exporting, from a plurality of hidden layers of a sequential data forecast machine including a neural network, a first version of a hidden state that includes time dependency information;
receiving, at a first input layer of a variational inference machine including a neural network, (i) time series data of a first time interval from at least a first sensor and (ii) the first version of the hidden state;
outputting, by a first output layer of the variational inference machine, a time dependency infused latent distribution that is generated based on the time series data of the first time interval and the first version of the hidden state;
obtaining, by the plurality of hidden layers, the first version of the hidden state;
receiving, at a second input layer of the sequential data forecast machine, (i) the time series data of the first time interval and (ii) the time dependency infused latent distribution from the variational inference machine;
updating the hidden state in the plurality of hidden layers based on the time series data of the first time interval, the time dependency infused latent distribution, and the first version of the hidden state to generate a second version of the hidden state;
inputting the time dependency infused latent distribution into a machine learning model including a neural network; and
outputting, from the machine learning model, a result of the first time interval based on the time dependency infused latent distribution.

29. A computer-implemented system comprising:
a multi-modal variational inference machine including a neural network that includes a first input layer, a first plurality of hidden layers, and a first output layer; and
a multi-modal sequential data forecast machine including a neural network that includes a second input layer and a second plurality of hidden layers, the second plurality of hidden layers including a hidden state, wherein the multi-modal variational inference machine and the multi-modal sequential data forecast machine are configured to iteratively perform:
exporting, from the second plurality of hidden layers, a first version of the hidden state, which includes time dependency information,
receiving, at the first input layer, (i) a first time dependency infused latent distribution of a first time interval from a first variational inference machine, (ii) a second time dependency infused latent distribution of the first time interval from a second variational inference machine, and (iii) the first version of the hidden state,
outputting, by the first output layer, a multi-modal time dependency infused latent distribution of the first time interval that is generated based on the first time dependency infused latent distribution of the first time interval, the second time dependency infused latent distribution of the first time interval, and the first version of the hidden state,
obtaining, by the second plurality of hidden layers, the first version of the hidden state,
receiving, at the second input layer, (i) the first time dependency infused latent distribution of the first time interval, (ii) the second time dependency infused latent distribution of the first time interval, and (iii) the multi-modal time dependency infused latent distribution of the first time interval from the multi-modal variational inference machine, and updating the hidden state in the second plurality of hidden layers based on the first time dependency infused latent distribution of the first time interval, the second time dependency infused latent distribution of the first time interval, the multi-modal time dependency infused latent distribution of the first time interval, and the first version of the hidden state to generate a second version Of the hidden state.

30. The computer-implemented system of claim 29, further comprising a machine learning model that is configured to:

input the multi-modal time dependency infused latent distribution of the first time interval into the machine learning model, and output, from the machine learning model, a result of the first time interval based on the multi-modal time dependency infused latent distribution of the first time interval.

31. The computer-implemented system of claim 29, wherein the first version of the hidden state is provided to at least:

a first variational inference machine and a first sequential data forecast machine, which generate the first time dependency infused latent distribution of the first time interval, and a second variational inference machine and a second sequential data forecast machine, which generate the first second dependency infused latent distribution of the second time interval.

32. A computer-implemented method comprising:

exporting, from a plurality of hidden layers of a multi-modal sequential data forecast machine including a neural network, a first version of a hidden state that includes time dependency information;

receiving, at a first input layer of a multi-modal variational inference machine including a neural network, (i) a first time dependency infused latent distribution of a first time interval from a first variational inference machine, (ii) a second time dependency infused latent distribution of the first time interval from a second variational inference machine, and (iii) the first version of the hidden state;

outputting, by a first output layer of the multi-modal variational inference machine, a multi-modal time dependency infused latent distribution that is generated based on the first time dependency infused latent distribution of a first time interval, the second time dependency infused latent distribution of the first time interval, and the first version of the hidden state;

obtaining, by the plurality of hidden layers, the first version of the hidden state;

receiving, at a second input layer of the multi-modal sequential data forecast machine, (i) the first time dependency infused latent distribution of the first time interval, (ii) the second time dependency infused latent distribution of the first time interval, and (iii) the multi-modal time dependency infused latent distribution of the first time interval from the multi-modal variational inference machine;

updating the hidden state in the plurality of hidden layers based on the first time dependency infused latent distribution of the first time interval, the second time dependency infused latent distribution of the first time interval, the multi-modal time dependency infused latent distribution of the first time interval, and the first version of the hidden state to generate a second version of the hidden state.

33. A computer-implemented system comprising:

a first neural network; and
a second neural network,
wherein the first neural network and the second neural network are configured to perform a procedure which includes:

outputting, from the second neural network, a first version of information which includes time dependency information, outputting, from the first neural network, second information that is generated based on (i) time series data of a first time interval from at least a first sensor and (ii) the first version of the information, outputting, from the second neural network, a second version of the information based on (i) the time series data of the first time interval, (ii) the second information, and the first version of the information.

34. The computer-implemented system as claimed in claim 33, wherein the second information includes latent variables.

35. The computer-implemented system as claimed in claim 33, wherein the second information includes a latent distribution.

36. The computer-implemented system as claimed in claim 33, wherein the first neural network and the second neural network are configured to perform the procedure iteratively.

37. The computer-implemented system as claimed in claim 33, further comprising a machine learning model configured to receive the time dependency infused latent variables and to output a result of the first time interval based on the time dependency infused latent variables.

38. The computer-implemented system as claimed in claim 33, wherein the first neural network includes a variational inference machine.

39. The computer-implemented system as claimed in claim 33, wherein the second neural network includes a sequential data forecast machine.

40. The computer-implemented system as claimed in claim 33, wherein the second neural network includes an input layer and a plurality of hidden layers, the plurality of hidden layers outputting the first version of the information.

* * * * *